(12) United States Patent
Heo et al.

(10) Patent No.: US 11,375,052 B2
(45) Date of Patent: Jun. 28, 2022

(54) DISPLAY MODULE INCLUDING SENSOR AND ELECTRONIC DEVICE INCLUDING THE DISPLAY MODULE

(71) Applicant: SAMSUNG ELECTRONICS CO., LTD., Suwon-si (KR)

(72) Inventors: Jihun Heo, Suwon-si (KR); Jihoon Park, Suwon-si (KR); Seungho Hwang, Suwon-si (KR); Bongjae Rhee, Suwon-si (KR); Dongchurl Kim, Suwon-si (KR); Hyunwoo Kim, Suwon-si (KR); Sanggeun Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 16/868,939

(22) Filed: May 7, 2020

(65) Prior Publication Data
US 2020/0358891 A1  Nov. 12, 2020

(30) Foreign Application Priority Data

May 9, 2019  (KR) .................. 10-2019-0054182

(51) Int. Cl.
  *G06F 1/16*   (2006.01)
  *H04M 1/02*   (2006.01)
  *G06V 40/13*  (2022.01)
(52) U.S. Cl.
  CPC ........ *H04M 1/0266* (2013.01); *G06F 1/1684* (2013.01); *G06V 40/1306* (2022.01)

(58) Field of Classification Search
  CPC ....................................................... H05K 5/00
  See application file for complete search history.

(56) References Cited

U.S. PATENT DOCUMENTS

| | | | |
|---|---|---|---|
| 9,934,418 B2 | 4/2018 | Mienko et al. |
| 10,133,111 B2 | 11/2018 | Lee |
| 10,303,919 B2 | 5/2019 | Mienko et al. |
| 10,452,937 B2 | 10/2019 | Jin et al. |
| 10,460,147 B2 | 10/2019 | Yang et al. |

(Continued)

FOREIGN PATENT DOCUMENTS

| | | |
|---|---|---|
| KR | 10-2018-0034750 | 4/2018 |
| KR | 10-2019-0066795 | 6/2019 |

(Continued)

OTHER PUBLICATIONS

International Search Report issued Aug. 26, 2020 in corresponding International Application No. PCT/KR2020/005983.

(Continued)

*Primary Examiner* — Jerry Wu
(74) *Attorney, Agent, or Firm* — Nixon & Vanderhye, P.C.

(57) ABSTRACT

An electronic device includes a display module including: a housing; a display including a first panel including a first surface, a second surface opposite the first surface, and a plurality of pixels interposed between the first surface and the second surface; a cover layer disposed on the first surface of the first panel; a second panel disposed on the second surface of the first panel; and a sensor coupled to the second surface of the first panel to provide a sensing area on the one surface of the housing.

16 Claims, 21 Drawing Sheets

(56) References Cited

U.S. PATENT DOCUMENTS

| | | |
|---|---|---|
| 10,571,734 B2 | 2/2020 | Lee |
| 10,664,680 B2 | 5/2020 | Xu et al. |
| 10,685,202 B2 | 6/2020 | Kim et al. |
| 11,106,076 B2 | 8/2021 | Lee |
| 2013/0094184 A1 | 4/2013 | Lee |
| 2017/0161540 A1 | 6/2017 | Mienko et al. |
| 2017/0364763 A1 | 12/2017 | Jin et al. |
| 2018/0089491 A1 | 3/2018 | Kim et al. |
| 2018/0204040 A1 | 7/2018 | Kwon et al. |
| 2018/0225501 A1 | 8/2018 | Mienko et al. |
| 2018/0293420 A1 | 10/2018 | Kim et al. |
| 2018/0314873 A1 | 11/2018 | Yang et al. |
| 2019/0034686 A1 | 1/2019 | Ling et al. |
| 2019/0050621 A1 | 2/2019 | Xu et al. |
| 2019/0073505 A1* | 3/2019 | Kwon .................. H01L 27/323 |
| 2019/0325188 A1 | 10/2019 | Jo et al. |
| 2020/0202097 A1 | 6/2020 | Kim et al. |

FOREIGN PATENT DOCUMENTS

| | | |
|---|---|---|
| KR | 10-2019-0121155 | 10/2019 |
| KR | 10-2020-0101176 | 8/2020 |
| WO | 2018/131839 | 7/2018 |

OTHER PUBLICATIONS

Extended Search Report and Written Opinion dated Jan. 12, 2022 in counterpart European Patent Application No. 20801936.4.

* cited by examiner

DISPLAY MODULE INCLUDING SENSOR AND ELECTRONIC DEVICE INCLUDING THE DISPLAY MODULE

CROSS-REFERENCE TO RELATED APPLICATION

This application is based on and claims priority under 35 U.S.C. § 119 to Korean Patent Application No. 10-2019-0054182, filed on May 9, 2019, in the Korean Intellectual Property Office, the disclosure of which is incorporated by reference herein its entirety.

BACKGROUND

1. Field

The disclosure relates to a display module including a sensor and an electronic device including the display module.

2. Description of Related Art

An electronic device may include a sensor to recognize biometric information. For example, the electronic device may include a sensor to recognize a fingerprint. The sensor to recognize the fingerprint may be viewed from the outside of the electronic device. For example, the sensor to recognize the fingerprint may be disposed at a lower end portion of a display area on a front surface of a housing in the electronic device. For another example, the sensor to recognize the fingerprint may be disposed on a rear surface of the housing in the electronic device.

As the size of a display in a portable electronic device is increased, the size of an area other than the display in the electronic device may be more decreased. Accordingly, research and studies have been continuously performed to mount various sensors on the front surface of the electronic device while increasing the size of the display. For example, attempts have been performed to implement a large-scale screen by disposing a fingerprint sensor of the electronic device in a display area of the display and reducing or removing a non-display area.

A sensor may be disposed on a rear surface of a display module. The display module may include a light shielding panel attached to the rear surface of a display panel. A hole may be formed in at least a partial area of the light shielding panel to obtain a fingerprint, which is input from the front surface of the display module, on the rear surface of the display. In this case, a hole having a size larger than that of a sensor surface of the sensor may be formed to insure the minimum space and interference in a process. When the sensor is mounted, an air gap may be formed between the sensor and the hole.

External light may be introduced into the display panel through the air gap. A photoelectric effect may be generated by the external light that has been introduced. A leakage current may be caused in a thin film transistor (TFT), which is to adjust the brightness of at least one pixel of the display, due to the photoelectric effect. When the display displays a lower-grayscale image, a display area corresponding to the air gap may be viewed brighter than another portion of the display, due to the leakage current. When the display displays a higher-grayscale image, the display area corresponding to the air gap may be viewed darker than another portion of the display, due to the leakage current resulting from the photoelectric effect. Accordingly, the air gap may be visually recognized by a user, due to the brightness difference of the display area.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below.

In accordance with an example embodiment of the disclosure, an electronic device may include: a housing; a display including a first panel having a first surface, a second surface opposite the first surface, and a plurality of pixels interposed between the first surface and the second surface; a cover layer disposed on the first surface of the first panel; a second panel disposed on the second surface of the first panel; and a sensor coupled to the second surface of the first panel of the display. The display may include an opening in the second panel configured to accommodate at least a portion of the sensor in the opening, the second panel may include a first layer coupled to the first panel on one surface of the second panel, and a second layer coupled to the first layer on a surface opposite the one surface of the first layer, the opening may include a first opening in the first layer, the first opening may be provided inside a closed area of a second opening in the second layer, and a circumference of the first opening may be spaced apart from a circumference of the second opening on the second layer by at least a specified distance.

In accordance with an example embodiment of the disclosure, a display module may include: a first panel having a first surface, a second surface opposite the first surface, and a plurality of pixels interposed between the first surface and the second surface; a cover layer disposed on the first surface of the first panel; a second panel disposed on the second surface of the first panel; and a sensor coupled to the second surface of the first panel. The second panel may include a first layer coupled to the first panel on one surface of the second panel and a second layer coupled to the first layer on a surface opposite the one surface of the first layer, the second panel may include an opening in the second panel configured to accommodate at least a portion of the sensor in the opening, the opening may include a first opening in the first layer, the first opening may be provided inside a closed area of a second opening in the second layer, and a circumference of the first opening may be spaced apart from a circumference of the second opening on the second layer by at least a specified distance.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

In the following description made with respect to the accompanying drawings, similar components will be assigned similar reference numerals.

DETAILED DESCRIPTION

Hereinafter, various example embodiments of the disclosure may be described with reference to accompanying drawings. However, those of ordinary skill in the art will understand that the disclosure is not limited to a specific embodiment, and various modifications, equivalents, and/or alternatives on the various example embodiments described herein can be variously made without departing from the scope and spirit of the disclosure.

Figure 1:
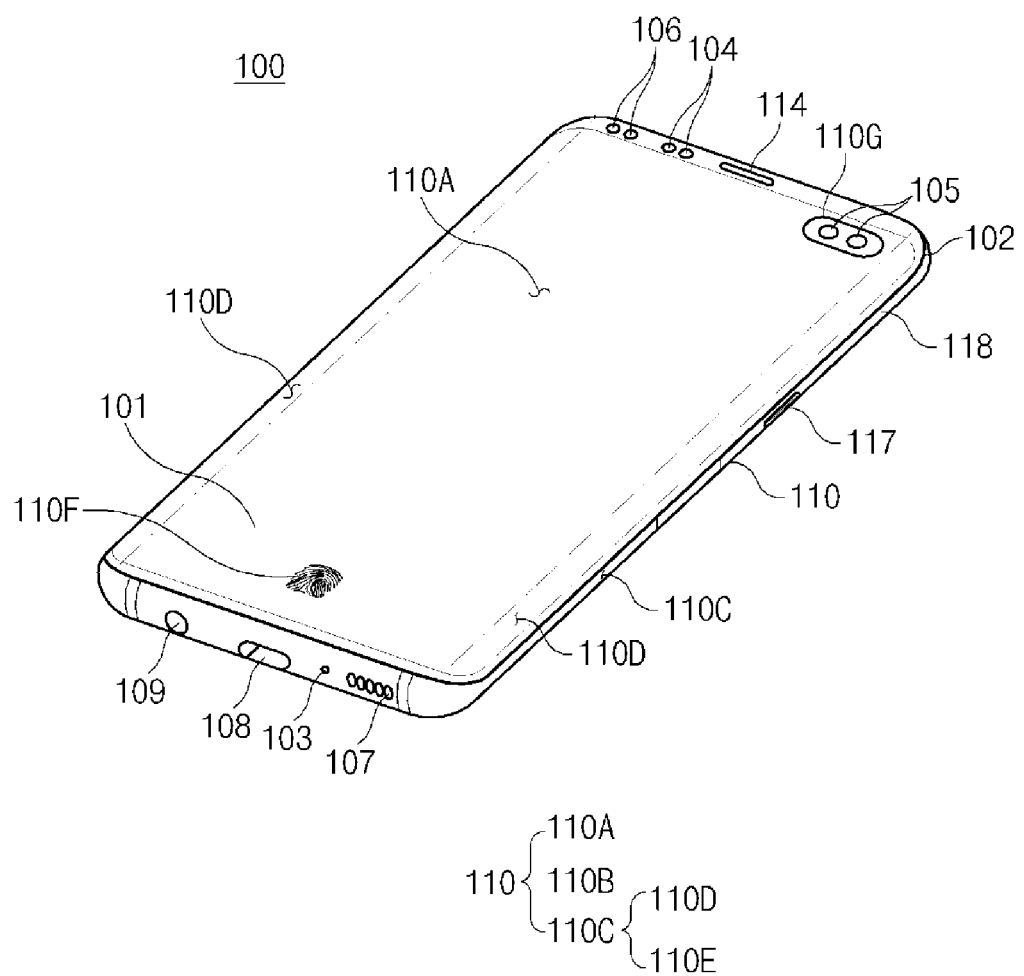
FIG. 1 is a front perspective view illustrating an example electronic device, according to an embodiment.
Figure 2:
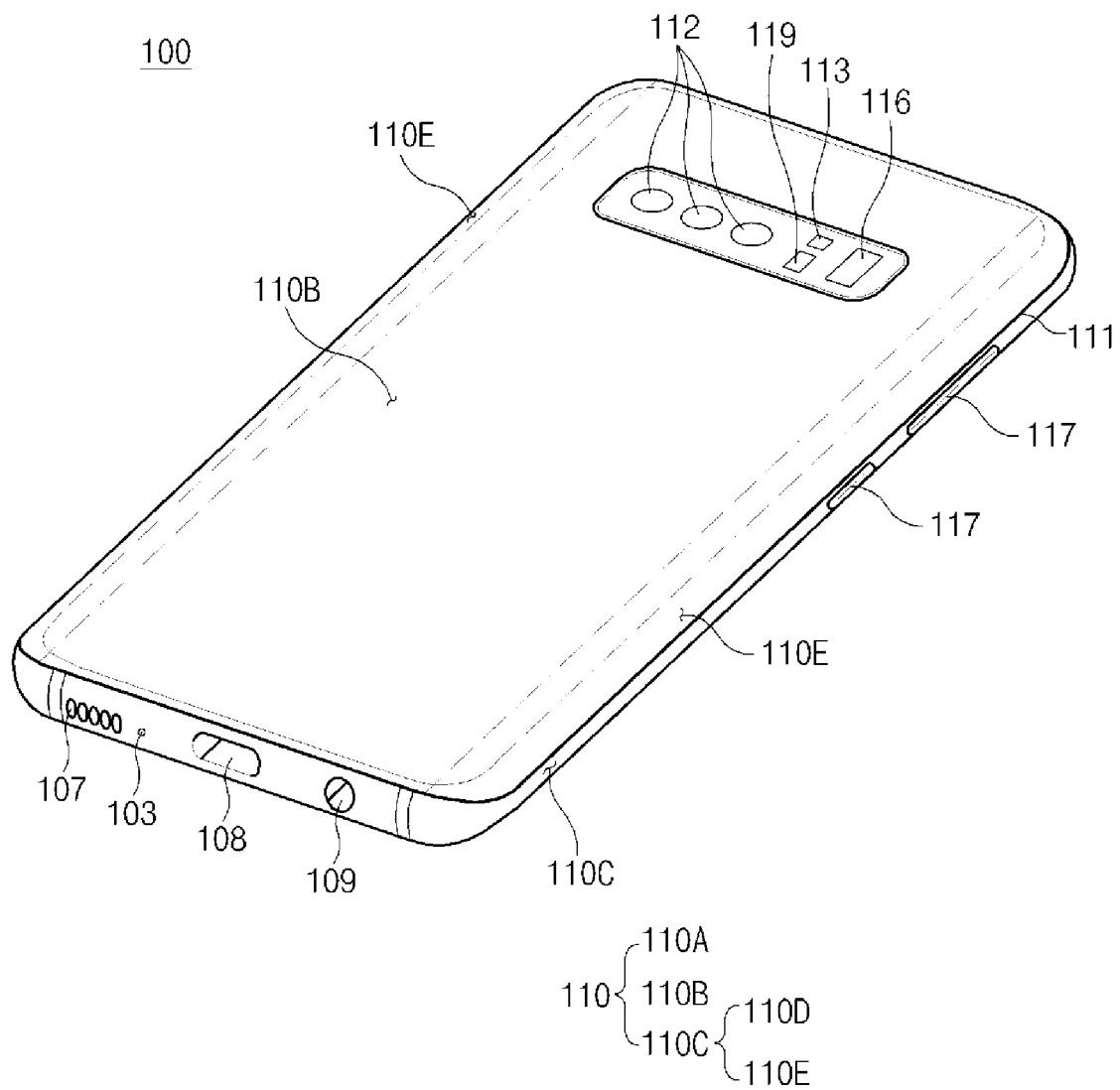
FIG. 2 is a rear perspective view illustrating the electronic device of FIG. 1, according to an embodiment.

FIG. 1 is a front perspective view illustrating an example electronic device, according to an embodiment. FIG. 2 is a rear perspective view illustrating the electronic device of FIG. 1, according to an embodiment.

Referring to FIGS. 1 and 2, an electronic device 100 may include a housing 110 including a first surface 110A (or front surface), a second surface 110B (or rear surface), and a side surface 110C surrounding the space between the first surface 110A and the second surface 110B.

In another embodiment (not illustrated), the housing 110 may be referred to as the structure forming some of the first surface 110A, the second surface 110B, and the side surface 110C of FIG. 1.

According to an embodiment, the first surface 110A may include a front plate 102 (e.g., a glass plate or a polymer plate including various coating layers) having at least a portion substantially transparent. The second surface 110B may be formed through a rear plate 111 substantially opaque. The rear plate 111 may include, for example, coating or colored glass, ceramic, polymer, metal (e.g., aluminum, stainless steel (STS), or magnesium) or the combination of at least two of the above materials. The side surface 110C may include a side bezel structure (or "side member") 118 which is coupled to the front plate 102 and the rear plate 111, and includes metal and/or polymer.

In an embodiment, the rear plate 111 and the side bezel structure 118 may be formed integrally with each other and may include the same material (e.g., a metal material such as aluminum).

In the illustrated embodiment, the front plate 102 may include two first areas 110D, which are bent toward the rear plate 111 from the first surface 110A while seamlessly extending, at opposite long edge ends of the front plate 102.

In an embodiment illustrated (see FIG. 2), the rear plate 111 may include two second areas 110E bent from the second surface 110B toward the front plate 102 while seamlessly extending and formed at opposite long edge ends of the rear plate 111.

In an embodiment, the front plate 102 (or the rear plate 111) may include only one of the first areas 110D (or the second areas 110E). In an embodiment, the front plate 102 (or the rear plate 111) may not include some of the first areas 110D (or the second areas 110E).

In embodiments, when viewed from the side surface of the electronic device 100, the side bezel structure 118 may have a first thickness (or width) at the side surface (e.g., a shorter side) having no first area 110D or second area 110E, and may have a second thickness thinner than the first thickness at the side surface (e.g., a longer side) including the first areas 110D or the second areas 110E.

In an embodiment, the electronic device 100 includes at least one a display 101, audio modules 103, 107, and 114, sensor modules 104, 116, and 119, camera modules 105, 112, and 113, a key input device 117, a light emitting device 106, and connector holes 108 and 109. In an embodiment, the electronic device 100 may omit at least one (e.g., the key input device 117 or the sensor module 104, or the light emitting device 106) of components or may additionally include other components.

The display 101 may be viewable, for example, through a substantial portion of the front plate 102. In an embodiment, at least a portion of the display 101 may be exposed through the front plate 102 including the first surface 110A and first areas 110D of the side surface 110C.

In an embodiment, the edge of the display 101 may be formed substantially identically to the shape of an adjacent outer shape of the front plate 102. In another embodiment (not illustrated), to expand an area for exposing the display 101, the distance between an outer portion of the display 101 and an outer portion of the front plate 102 may be substantially uniformly formed.

In an embodiment, the surface (or the front plate 102) of the housing 110 may include a screen display area formed as the display 101 is visually exposed. For example, the screen display area may include the first surface 110A and first areas 110D of the side surface.

In the illustrated embodiment, the screen display areas 110A and 110D may include a sensing area 110F configured to obtain biometric information of a user. In the disclosure, that the screen display areas 110A and 110D include the sensing area 110F that may overlap with the screen display areas 110A and 110D. In other words, the sensing area 110F may refer to an area to display visual information through the display 101, which is similar to another area of the screen display areas 110A and 110D and to additionally obtain the biometric information (e.g., a fingerprint) of the user.

In the illustrated embodiment, the screen display areas 110A and 110D of the display 101 may include an area 110G through which the first camera device 105 (e.g., a punch hole camera) may be visually exposed. At least a portion of an edge of the area, through which the first camera device 105 is exposed, may be surrounded by the screen display areas 110A and 110D.

In another embodiment (not illustrated), the screen display areas 110A and 110D of the display 101 may have a recess or an opening formed in a portion of the screen display areas 110A and 110D of the display 101 and may include at least one of the audio module 114, the first sensor module 104, and the light emitting component 106 aligned in line with the recess or the opening.

According to another embodiment (not illustrated), the display 101 may include the audio module 114, the sensor modules 104, 116, and 119, and the light emitting device 106, on the rear surface of the screen display areas 110A and 110D.

In another embodiment (not illustrated), the display 101 may be coupled or disposed adjacent to a touch sensing circuit, a pressure sensor to measure the intensity (pressure) of a touch, and/or a digitizer to detect the stylus pen based on an electromagnetic scheme.

In an embodiment, at least some of the sensor modules 104, 116, and 119 and/or at least a portion of the key input device 117 may be disposed on the side surface 110C (e.g., the first areas 110D and/or the second areas 110E).

The audio modules 103, 107, and 114 may include the microphone hole 103 and the speaker holes 107 and 114. The microphone hole 103 may have a microphone disposed therein to obtain an external sound. In an embodiment, the microphone hole 103 may have a plurality of microphones disposed therein to sense the direction of a sound. The speaker holes 107 and 114 may include the external speaker hole 107 and the receiver hole 114 for conversation. In an embodiment, the speaker holes 107 and 114 and the microphone hole 103 may be implemented into one hole or a speaker may be included without the speaker holes 107 and 114 (e.g., a piezoelectric speaker).

In an embodiment, the sensor modules 104, 116, and 119 may generate electrical signals or data values corresponding to an internal operating state of the electronic device 100 or an external environment state of the electronic device 100. For example, the sensor modules 104, 116, and 119 may include the first sensor module 104 (e.g., a proximity sensor) disposed on the first surface 110A of the housing 110, the second sensor module 116 (e.g., a TOF camera device) disposed on the second surface 110B of the housing 110, the third sensor module 119 (e.g., a HRM sensor) disposed on the second surface 110B of the housing 110 and/or a fourth sensor module (e.g., a sensor 190 of FIG. 3 (e.g., a fingerprint sensor)) coupled to the display 101.

In various embodiments, the second sensor module 116 may include a TOF camera device for distance measurement.

In various embodiments, at least a portion of the fourth sensor module (e.g., the sensor 190 of FIG. 3) may be disposed under the screen display areas 110A and 110D. For example, the fourth sensor module may be disposed in a recess (e.g., the recess 139 of FIG. 3) formed in the rear surface of the display 101. In other words, the fourth sensor module (e.g., the sensor 190 of FIG. 3) is not exposed through the screen display areas 110A and 110D, and the sensing area 110F may be formed in at least a portion of the screen display areas 110A and 110D.

In an embodiment (not illustrated), the fingerprint sensor may be disposed on the second surface 110B as well as the first surface 110A (e.g., the screen display areas 110A and 110D) of the housing 110.

In various embodiments, the electronic device 100 may further include at least one of a sensor module, which is not illustrated, for example, at least one of a gesture sensor, a gyro sensor, an air pressure sensor, a magnetic sensor, an acceleration sensor, a grip sensor, a color sensor, an infrared sensor, a biometric sensor, a temperature sensor, a humidity sensor, or an illuminance.

The camera modules 105, 112, and 113 may include the first camera device 105 (e.g., a punch hole camera device) exposed through the first surface 110A of the electronic device 100, the second camera device 112 exposed through the second surface 110B and/or the flash 113.

In the illustrated embodiment, the first camera device 105 may be exposed through a portion of the first surface 110A. For example, the first camera device 105 may be exposed through an opening (not illustrated) formed in a portion of the display 101.

In the illustrated embodiment, the second camera device 112 may include a plurality of camera devices (e.g., a dual camera, or a triple camera). However, the second camera device 112 is not necessarily limited to including a plurality of camera devices, and may include a single camera device.

The camera devices 105 and 112 may include one or more lenses, an image sensor, and/or an image signal processor. The flash 113 may include, for example, a light emitting diode or a xenon lamp. In some embodiments, two or more lenses (infrared camera, wide-angle and telephoto lenses) and image sensors may be disposed on one side of the electronic device 100.

The key input devices 117 may be disposed on the side surface 110C of the housing 110. In another embodiment, the electronic device 100 may not include some or all of the key input devices 117 mentioned above, and the some or the all of the key input devices 117, which is not included, may be implemented in different forms, such as a soft key, on the display 101. In an embodiment, the key input devices 117 may include a sensor module (e.g., the sensor 190 of FIG. 3) forming the sensing area 110F included in the screen display areas 110A and 110D.

The light emitting device 106 may be, for example, disposed on the first surface 110A of the housing 110. The light emitting device 106 may provide, in the form of light, the state information of the electronic device 100. In another embodiment, the light emitting device 106 may, for example, provide light linked to the operation of the first camera device 105. The light emitting device 106 may include, for example, an LED, an IR LED, and a xenon lamp.

The connector holes 108 and 109 may include the first connector hole 108 to receive a connector (for example, a USB connector) to transmit or receive power and/or data together with an external electronic device, and/or the second connector hole 109 (for example, an earphone jack) to transmit or receive an audio signal together with the external electronic device.

Figure 3:
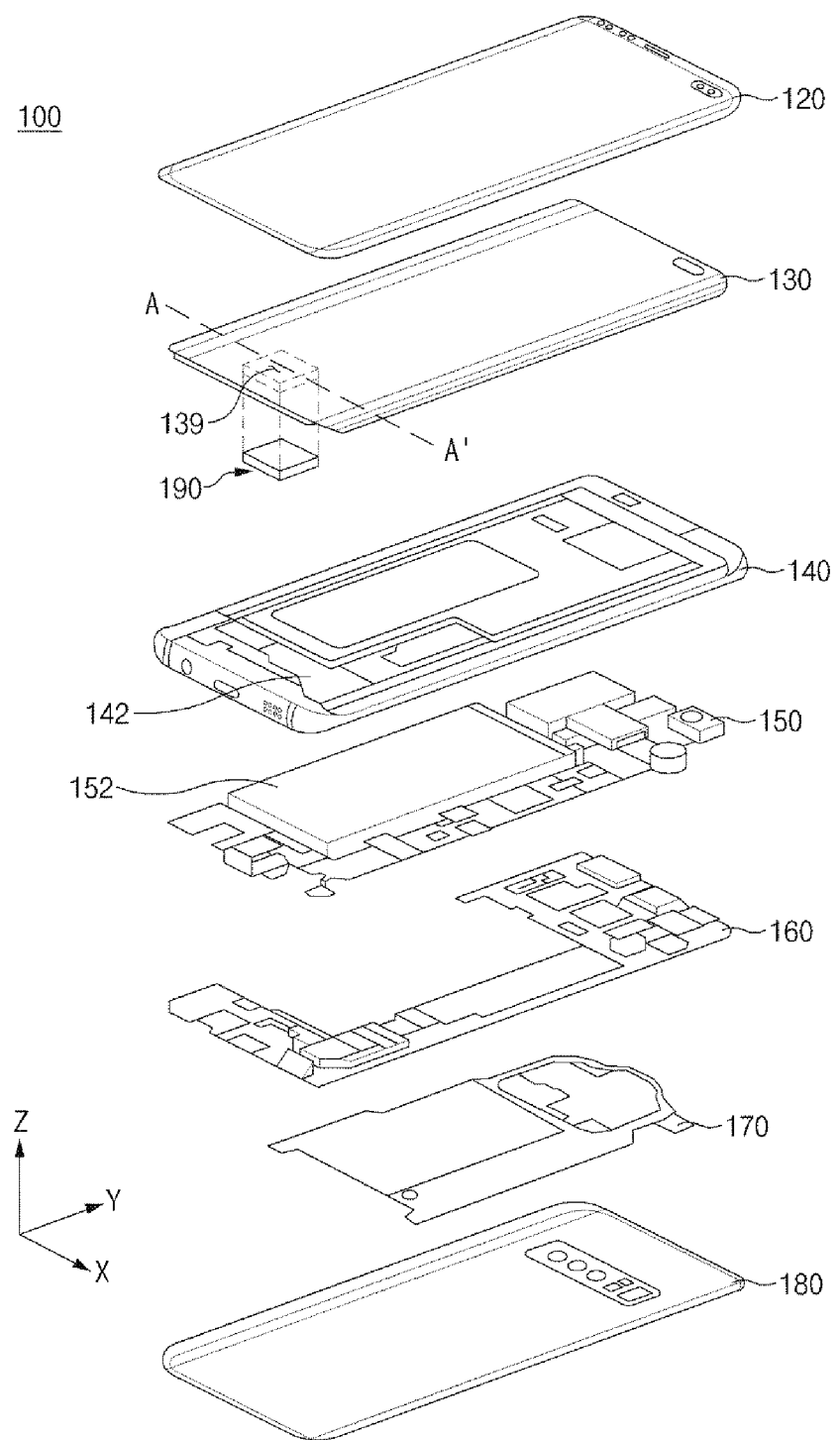
FIG. 3 is an exploded perspective view of the electronic device of FIG. 1, according to an embodiment.

FIG. 3 is an exploded perspective view illustrating the electronic device of FIG. 1, according to an embodiment.

Referring to FIG. 3, the electronic device 100 may include a side member 140 (e.g., a side housing), a first support member 142 (e.g., a bracket), a front plate 120, a display 130 (e.g., the display 101 of FIG. 1), a printed circuit board 150, a battery 152, a second support member 160 (e.g., a rear case), an antenna 170, and a rear plate 180. In an embodiment, the electronic device 100 may omit at least one (e.g., the first support member 142 or the second support member 160) of components or may additionally include other components. At least one of components of the electronic device 100 may be identical to or similar to at least one of components of the electronic device 100 of FIG. 1 or FIG. 2, and the duplicated description may not be repeated here.

The first support member 142 is disposed in the electronic device 100 to be coupled to the side member 140 or to be integrated with the side member 140. The first support member 142 may include, for example, a metal material and/or a non-metal material (e.g., polymer). The first support member 142 may have one surface coupled to the display 130 and an opposite surface coupled to the printed circuit board 150. A processor, a memory, and/or an interface may be mounted on the printed circuit board 150. The processor may include, for example, one or more of a central processing unit, an application processor, a graphic processing unit, an image signal processor, a sensor hub processor, or a communication processor.

The memory may include, for example, a volatile memory and/or a non-volatile memory.

The interface may include, for example, a high definition multimedia interface (HDMI), a universal serial bus (USB) interface, an SD card interface, and/or an audio interface. The interface may, for example, electrically or physically connect the electronic device 100 with the external electronic device and may include a USB connector, an SD card/MMC connector, or an audio connector The battery 152 may include a device to supply power to at least one component of the electronic device 100, for example, a non-rechargeable primary battery, or a rechargeable secondary battery, or a fuel cell. At least a portion of the battery 152 may be, for example, on substantially coplanar with the printed circuit board 150. The battery 152 may be disposed inside the electronic device 100 integrally with the electronic device 100, and may be disposed detachably from the electronic device 100.

The antenna 170 may be interposed between the rear plate 180 and the battery 152. The antenna 170 may include, for example, a near field communication (NFC) antenna, a wireless charging antenna, and/or a magnetic secure transmission (MST) antenna. The antenna 170 may make short-range communication with an external device or may wirelessly transmit or receive power necessary for charging. In another embodiment, an antenna structure may be formed by a portion of the side member 140 and/or the first support member 142 or the combination of the side member 140 and the first support member 142

In the illustrated embodiment, the electronic device 100 may further include the sensor 190 coupled to the display 130. At least a portion of the sensor 190 may be disposed in the recess 139 (e.g., an opening 225 of FIGS. 4A and 4B) formed in the rear surface of the display 130. The sensor 190 may include a sensing area (e.g., the sensing area 110F of FIG. 1) formed at a portion of the first plate 120.

Figure 4A:
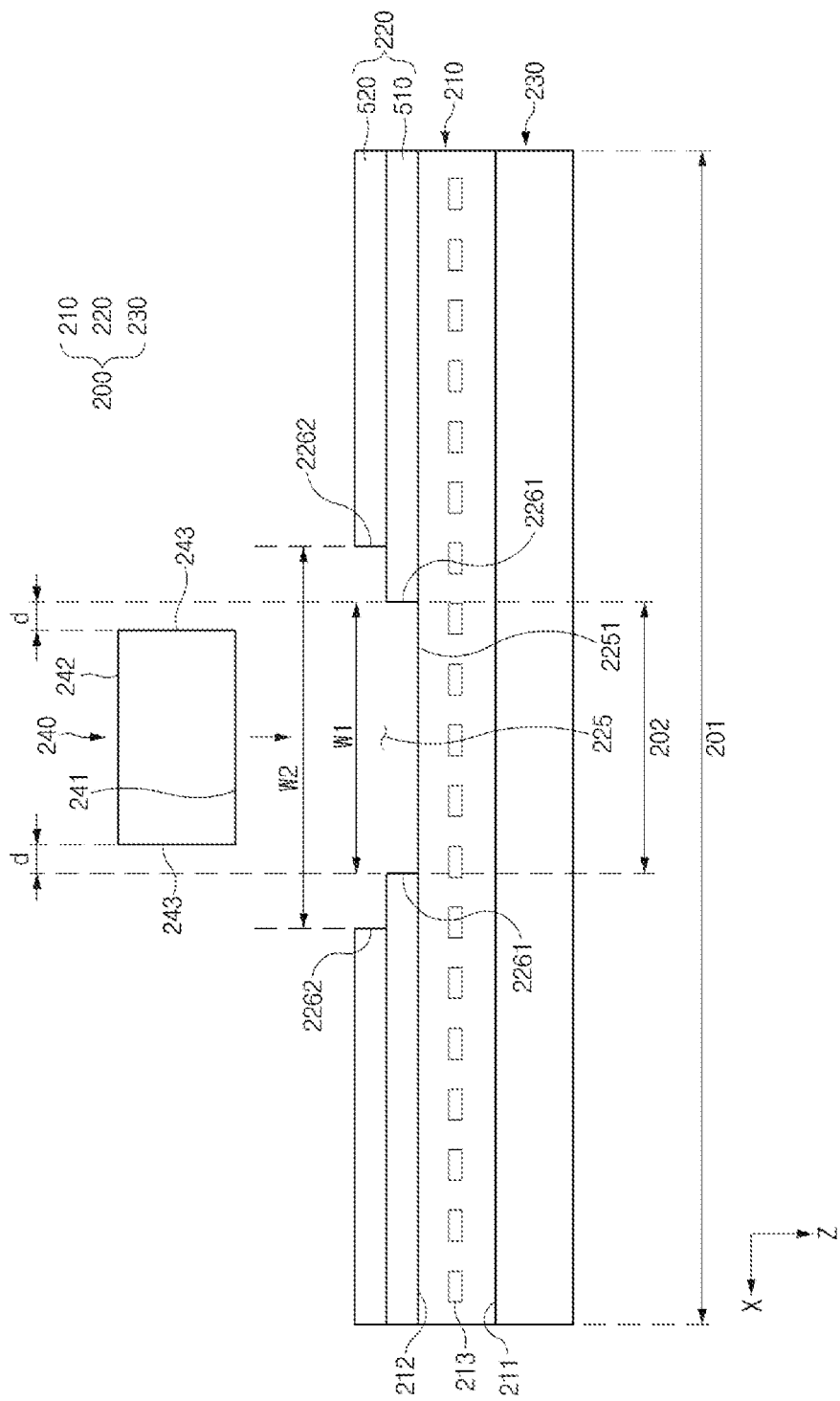
FIG. 4A is a cross-sectional view illustrating an example display of an electronic device, according to an embodiment.
Figure 4B:
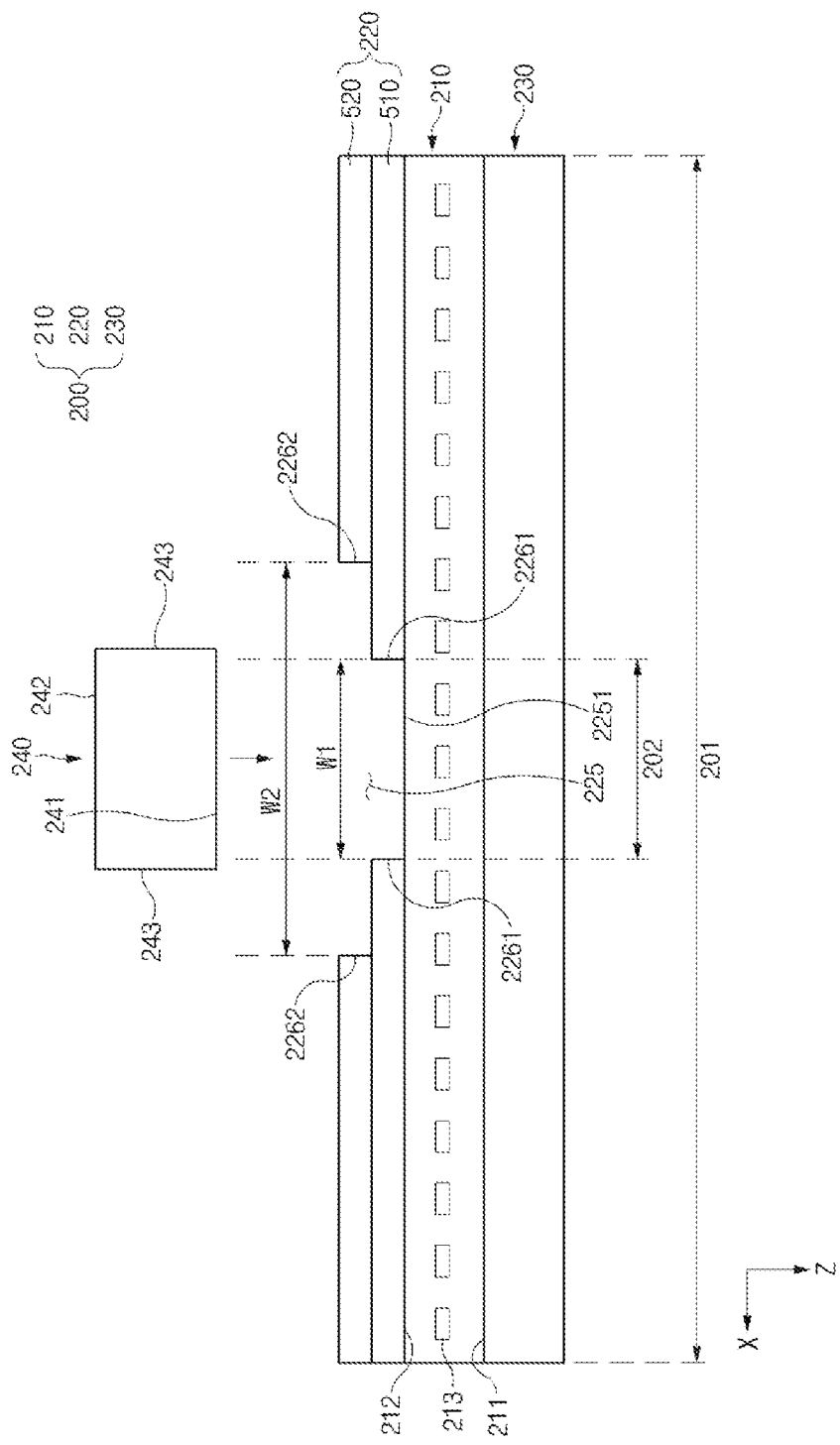
FIG. 4B is a cross-sectional view illustrating an example display of an electronic device, according to an embodiment.

FIG. 4A is a cross-sectional view illustrating an example display module 200 of the electronic device 100, according to an embodiment. FIG. 4B is a cross-sectional view taken along line A-A' of FIG. 3, according to an embodiment.

For example, the display module 200 may include display panels 210, 220, and 230 (e.g., the display 130 of FIG. 3) and a sensor 240 (e.g., the sensor 190 of FIG. 3). For another example, the display module 200 may include the displays 210, 220, and 230 and the sensor 240 may be coupled to the display module 200.

In the illustrated embodiment, the display module 200 may include the first panel 210 including a plurality of pixels 213, the cover layer 230 disposed on a first surface 211 (e.g., +Z axis direction) of the first panel 210, and the second panel 220 disposed on a second surface 212 (e.g., −Z axis direction) of the first panel 210. For example, the sensor 240 may be coupled to the first panel 210. The first panel 210 may be disposed between the second panel 220 and the cover layer 230.

In the illustrated embodiment, the first panel 210 may include the first surface 211 facing a first direction (e.g., +Z axis direction) and the second surface 212 facing a second direction (e.g., −Z axis direction) opposite to the first direction. The first direction may be, for example, a direction (e.g., a direction facing the first plate 120 of FIG. 3) facing the front surface of the electronic device 100, and the second direction may be a direction (e.g., a direction facing the second plate 180 of FIG. 3) facing the rear surface of the electronic device 100.

In the illustrated embodiment, the cover layer 230 may form at least a portion (e.g., the first plate 120 of FIG. 3) of a first plate, at least a portion of the cover layer 230 may form a first surface (e.g., the first surface 110A of FIG. 1) of the housing (e.g., the housing 110 of FIG. 1), or may form the surface of the electronic device 100.

In various embodiments, the cover layer 230 may be transparently formed. The cover layer 230 may include a transparent material. In various embodiments, the cover layer 230 may include various materials. For example, the cover layer 230 may include a material of a glass or polymer (e.g., polyimide (PI), polyethylene terephthalate (PET)).

In various embodiments, the cover layer 230 may have a screen display area 201 formed by the first panel 210 disposed in the second direction (e.g., −z axis direction) of the cover layer 230. In addition, the cover layer 230 may have a sensing area 202 formed by the sensor 240. For example, the sensing area 202 and the screen display area 201 may at least partially overlap with each other.

In various embodiments, the sensor 240 may transmit, receive, and/or sense a signal (e.g., an optical signal or an ultrasonic signal). For example, the signal may travel toward a portion (e.g., a fingerprint of a finger) of a body of a user through the sensing area 202 from the sensor 240, and the signal reflected by a portion of the body of the user may be received by the sensor 240 through the sensing area 202 again. For another example, the signal may be emitted from at least a portion of the first panel 210, and the signal reflected by the portion of the body of the user may be received by the sensor 240 through the sensing area 202.

In the illustrated embodiment, the first panel 210 may include a pixel layer including the plurality of pixels 213. The pixel layer may include the screen display area 201 formed on the first plate (e.g., the first plate 120 of FIG. 3; the front surface of the electronic device 100). In an embodiment, the first panel 210 may further include a touch layer (not illustrated) including a plurality of touch sensors.

Figure 5:
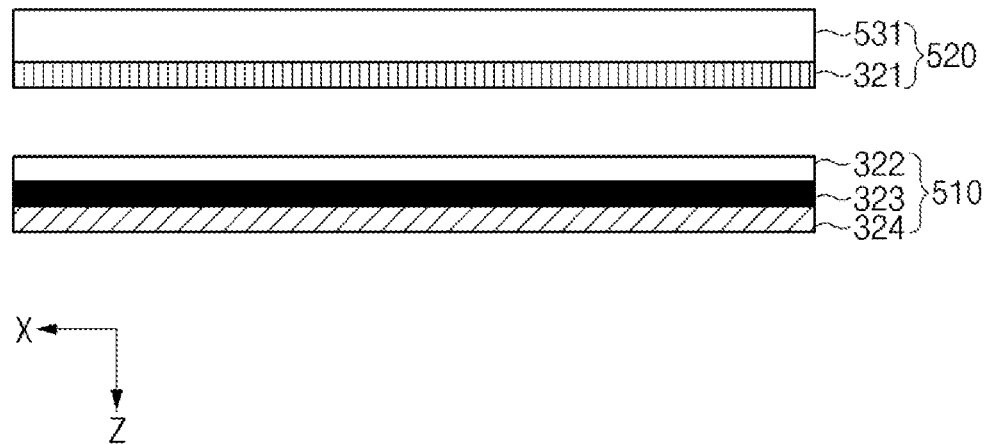
FIG. 5 is a diagram illustrating an example layer structure of a second panel, according to an embodiment.

In the illustrated embodiment, the second panel 220 may include a first layer 510 and a second layer 520. FIG. 5 illustrates an example layer structure of the second panel 220, according to an embodiment.

Referring to FIG. 5, the second panel 220 may optically and/or electrically shield the first panel 210.

According to an embodiment, the first layer 510 may refer to a layer to optically shield the first panel 210. For example, the first layer 510 may include, for example, a black embo-layer (e.g., a black layer including an irregular pattern). The first layer 510 may include an embossed pattern formed in at least one surface of the first layer 510 to prevent and/or reduce light or moisture from being introduced into the first panel 210. The first layer 510 may include, for example, a first adhesive layer 324, a black polymer layer 323, and a second adhesive layer 322.

For example, the first adhesive layer 324 may include, for example, a double-sided adhesive member that bonds the first panel 210 with the second panel 220. A surface (e.g., a surface in the z+ direction), which faces the first panel 210, of the first adhesive layer 324 may be applied, in an irregular shape, with an adhesive material, to prevent and/or reduce bubbles from being formed. The first adhesive layer 324 may be interposed between the first panel 210 and the black polymer layer 323.

For example, the black polymer layer 323 may be interposed between the first adhesive layer 324 and the second adhesive layer 322. The black polymer layer 323 may include a black material (e.g., ink) to prevent and/or reduce external light from being introduced into the first panel 210 through the second panel 220. For example, the black polymer layer 323 may include a layer to maintain the panel of the first layer 510 to be in the irregular pattern (e.g., the embossed pattern). For example, the black polymer layer 323 may be interposed between the first adhesive layer 324 and the second adhesive layer 322. The irregular pattern of the black polymer layer 323 may prevent and/or reduce bubbles from being formed when the first layer 510 is attached to the second layer 520. According to an embodiment, the black polymer layer 323 may include a plurality of layers. For example, the black polymer layer 323 may include a black layer having a light shielding property and a polymer layer having an embossed pattern.

According to an embodiment, the first layer 510 may further include the second adhesive layer 322 to combine the first layer 510 with the second layer 520.

According to an embodiment, the second layer 520 may include a layer to electrically shield the display module and/or to radiate heat. For example, the second layer 520 may include a buffer member 321 and a rear surface layer 531. The second layer 520 may be attached to a surface opposite to a surface, which is attached to the first panel 210, of the first layer 510.

For example, the buffer member 321 may correspond to an impact absorbing member to absorb an impact.

For example, the rear surface layer 531 may include a shielding layer and/or a heat radiation layer. The shielding layer may shield another electrical component (e.g., an electrical device disposed on a printed circuit board) from noise, which is produced from the display module 200. According to an embodiment, the shielding layer may include a copper (Cu) sheet. According to an embodiment, the heat radiation layer may include a graphite material. The rear surface layer 531 may further include an adhesive layer (not illustrated) to combine the buffer member 321 with remaining layers.

The first layer 510 and the second layer 520 illustrated in FIG. 5 are provided for the illustrative purpose, and the embodiments in the disclosure is not limited thereto. For example, the first layer 510 may be a layer at least including layers between the light shielding layer (e.g., the black layer 323) and the first panel 210.

The structure of the second panel 220 illustrated in FIG. 5 is provided for the illustrative purpose, and the embodiments in the disclosure are not limited thereto. For example, the second panel 220 disclosed in the disclosure may include layers stacked in order different from the order that the layers illustrated in FIG. 5 are stacked, may further include an additional layer, or may not have some layers.

Referring back to FIG. 4A, according to various embodiments, the display module 200 may further include a protection film (PF) (not illustrated). For example, the protection film (PF) may be interposed between the first panel 210 and the second panel 220 to protect the first panel 210. For another example, the protection film (PF) may be included in the first panel 210.

In the illustrated embodiment, the display module 200 may include the opening 225 formed through the second panel 220. For example, the opening 225 may have a rectangular, square, circular, or oval shape when the display module 200 is viewed in the +z axis direction. For another example, the opening 225 may have the shape corresponding to the combination of various shapes. According to an embodiment, the opening 225 may be formed through the second panel 220 when viewed in the −z axis direction. For example, the second surface 212 may be directly exposed through the opening 225. For another example, the second surface 212 may be visually exposed through the opening 225 and the protection film (not illustrated). For another example, the protection film (PF) may be exposed through the opening 225. In this case, at least a portion of the sensor 240 may be disposed inside the opening 225. According to an embodiment, the opening 225 may include inner sidewalls having a step difference. For example, the opening 225 may include a first inner sidewall 2261 formed at the first layer 510 and a second inner sidewall 2262 formed at the second layer 520.

In the illustrated embodiment, the opening 225 may be referred to as a recess formed in the display module 200 or one surface of the display. For example, the recess may include a first recess (e.g., a recess formed by the second inner sidewall 2262) formed at the second layer 520 and a second recess (e.g., a recess formed by the first inner sidewall 2261) formed in the bottom surface of the first recess. The second recess may be formed inside the first recess to form a step-difference surface on the bottom surface of the first recess. For example, the recess may include a bottom surface 2251, first inner sidewalls 2261 facing each other, and second inner sidewalls 2262 facing each other. The first inner sidewalls 2261 may face each other with a width of at least W1 and the second inner sidewalls 2262 may face each other with a width of at least W2. For example, W2 may be greater than W1. The bottom surface 2251 may include a portion of the second surface 212 of the first panel 210. The second inner sidewall 2262 includes an end surface of the second layer 520, which is generated from an opening (e.g., a closed area) formed in the second layer 520 of the second panel 220, and the first inner sidewall 2261 may include an end surface of the first layer 510, which is generated from an opening (e.g., a closed area) formed in the first layer 510 of the second panel 220.

For example, the opening 225 may be formed to be larger than the sensor 240 such that the width W1 between the first inner sidewalls 2261 is greater than the side surface of at least a portion of the sensor 240, which is to be mounted in the opening 225, by at least a specific distance (e.g., 'd'). The shape of the sensor 240 illustrated in FIG. 4A is provided for the illustrative purpose, and the embodiments in the disclosure are not limited thereto. For example, only a portion of the sensor 240 may be mounted in the opening 225, and a remaining portion of the sensor 240 may protrude from the opening 225. The size of the remaining portion, which protrudes from the opening 225, of the sensor 240, may be greater than the opening 225.

In the illustrated embodiment, the sensor 240 may include a first surface 241 disposed to face the first panel 210, a second surface 242 opposite to the first surface 241, and a side surface 243 interposed between the first surface 241 and the second surface 242.

According to various embodiments, the sensor 240 may be inserted into the opening 225 such that the first surface 241 is attached to the bottom surface 2251 of the opening 225 and the side surface 243 is spaced apart from the first inner sidewall 2261 of the opening 225 by a specific distance (e.g., 'd').

Hereinafter, the sensor 240 disclosed according to various embodiments in the disclosure may include, for example, and without limitation, an ultrasonic sensor. The ultrasonic sensor may be configured to obtain biometric information (e.g., the structure of the fingerprint) of a user using an ultrasonic wave having a specific frequency.

In various embodiments, the ultrasonic sensor transmits an ultrasonic wave toward a part of a body of the user close to (e.g., contact with) the sensing area 202 (e.g., the sensing area 110F of FIG. 1) formed at the cover layer 230, and receives an ultrasonic wave reflected from the part of the body of the user to obtain biometric information of the user. For example, the sensor 240 may be an ultrasonic fingerprint sensor to obtain the fingerprint information of the user, and the biometric information of the user may correspond to the fingerprint of the user. The structures of the display 200 and the sensor 240, which have been described with reference to FIG. 4A, are provided only for the illustrative purpose, and embodiments in the disclosure are not limited thereto.

FIG. 4B is a cross-sectional view of the display 200 of an electronic device, according to an embodiment. Unless specified otherwise, the description made with reference to FIG. 4A may be similarly applied to an example of FIG. 4B.

Although FIG. 4A illustrates that the sensor 240 is attached to the bottom surface 2251 (e.g., the second surface 212 of the first panel 210) of the opening 225, embodiments in the disclosure are not limited thereto. Referring to FIG. 4B, according to an embodiment, the opening (e.g., the opening defined by the first inner sidewall 2261) at the first layer 510 may be smaller than the first surface 241 of the sensor 240. In this case, a portion of the first surface 241 of the sensor 240 may be positioned on a portion of the first layer 510.

Figure 6:
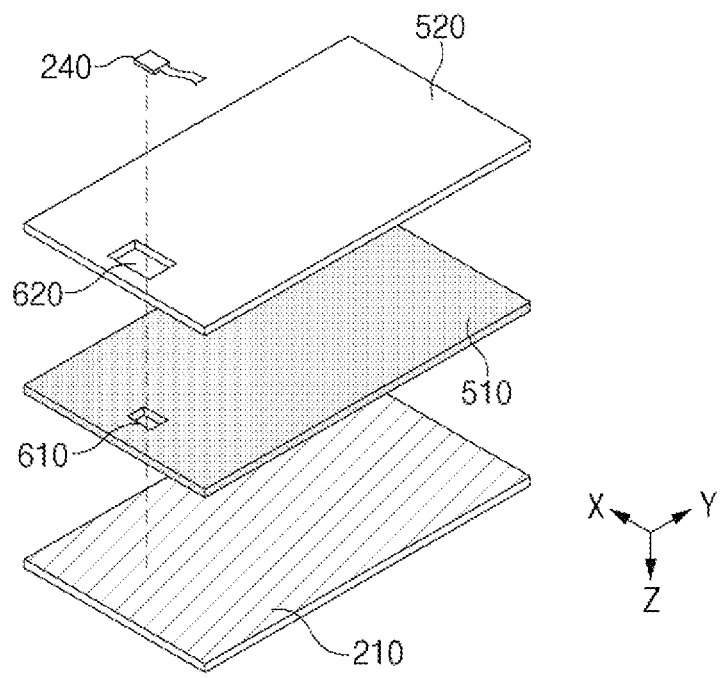
FIG. 6 is an exploded perspective view illustrating an example display, according to an embodiment.

FIG. 6 is an exploded perspective view illustrating the display 200, according to an embodiment.

As described with reference to FIGS. 4A and 4B, the display 200 may include an opening (e.g., the opening 225 of FIGS. 4A and 4B) of the second panel 220 including inner sidewalls (e.g., the first inner sidewall 2261 and the second inner sidewall 2262 of FIGS. 4A and 4B) having the step difference. For example, the opening 225 may include a first opening 610 formed in the first layer 510 and a second opening 620 formed in the second layer 520. When the first layer 510 is combined with the second layer 520, the first opening 610 is formed inside the second opening 620. A boundary of a second closed area formed by the second opening 620 may be spaced apart from a boundary of a first closed area formed by the first opening 610 by a specified distance.

For example, after forming the first opening 610 and the second opening 620, the first layer 510 and the second layer 520 may be combined with each other. For another example, after combining the second layer 520 having the second opening 620 with the first layer 510, the first opening 610 may be formed through the second opening 620. A manner of forming the first opening 610 and the second opening 620 is provided for the illustrative purpose, and embodiments in the disclosure are not limited thereto.

Figure 7:
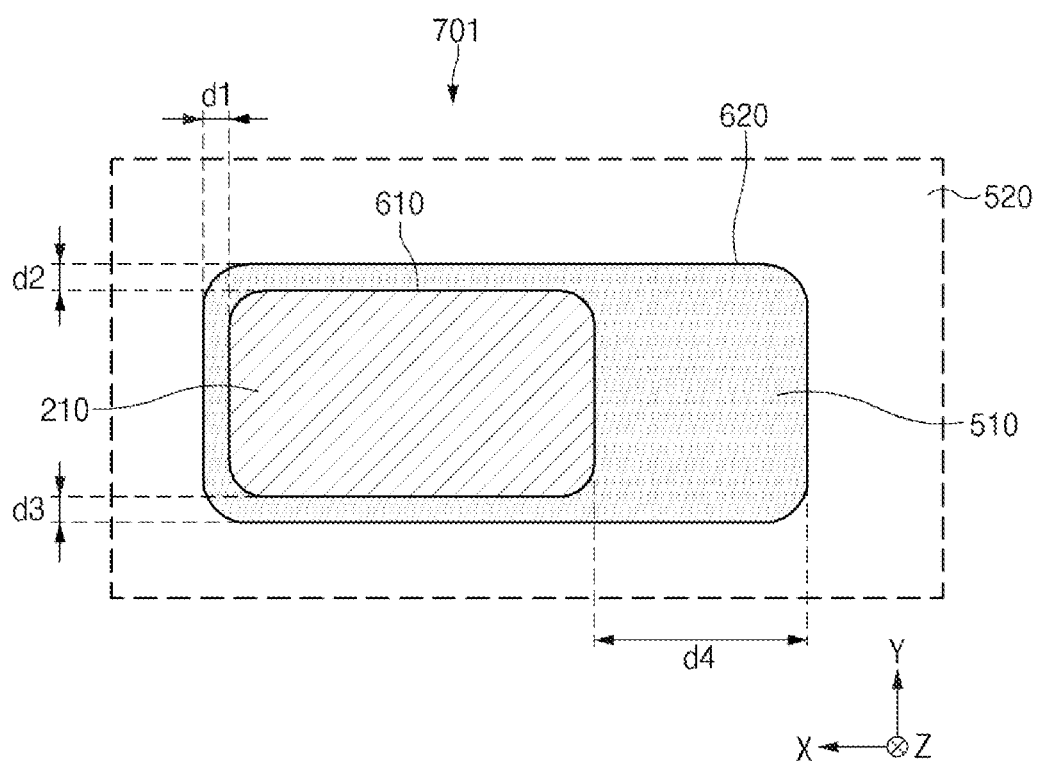
FIG. 7 is a diagram illustrating an example shape of an opening, according to an embodiment.

FIG. 7 is a diagram illustrating an example shape of an opening, according to an embodiment.

According to an embodiment, the second opening 620 may be formed to have an offset from four surfaces of the first opening 610. For example, the second opening 620 may be spaced apart from a first side (e.g., a left side perpendicular to the +X axis direction) of the first opening 610 by a specified distance (e.g., d1) in a first direction (e.g., +X axis direction). For example, the second opening 620 may be spaced apart from a second side (e.g., an upper side perpendicular to the +Y axis direction) of the first opening 610 by a specified distance (e.g., d2) in a second direction (e.g., +Y axis direction). For example, the second opening 620 may be spaced apart from a third side (e.g., a lower side perpendicular to the −Y axis direction) of the first opening 610 by a specified distance (e.g., d3) in a third direction (e.g., −Y axis direction). The second opening 620 may be spaced apart from a fourth side (a right side perpendicular to the −X axis direction) of the first opening 610 by a specified distance (e.g., d4) in a fourth direction (e.g., −X axis direction). For example, the specified distance d4 may be longer than the specified distances d1, d2, and d3.

Figure 8A:
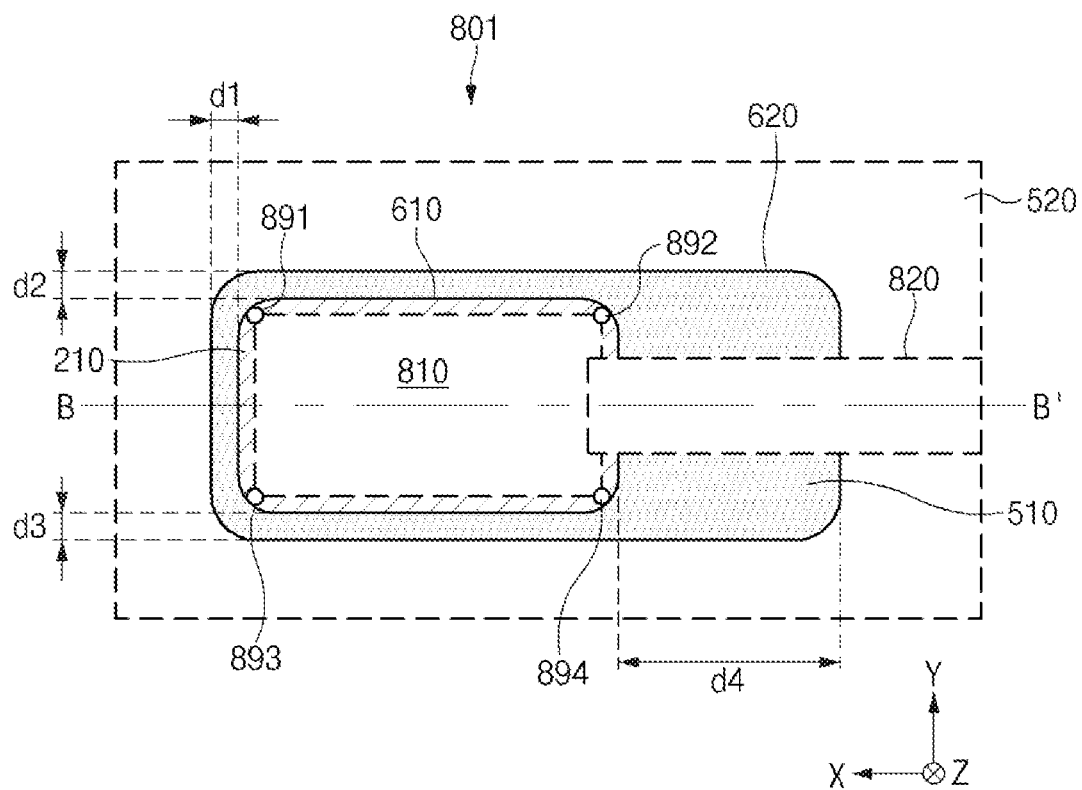
FIG. 8A is a diagram illustrating an example sensor mounting structure, according to an embodiment.
Figure 8B:
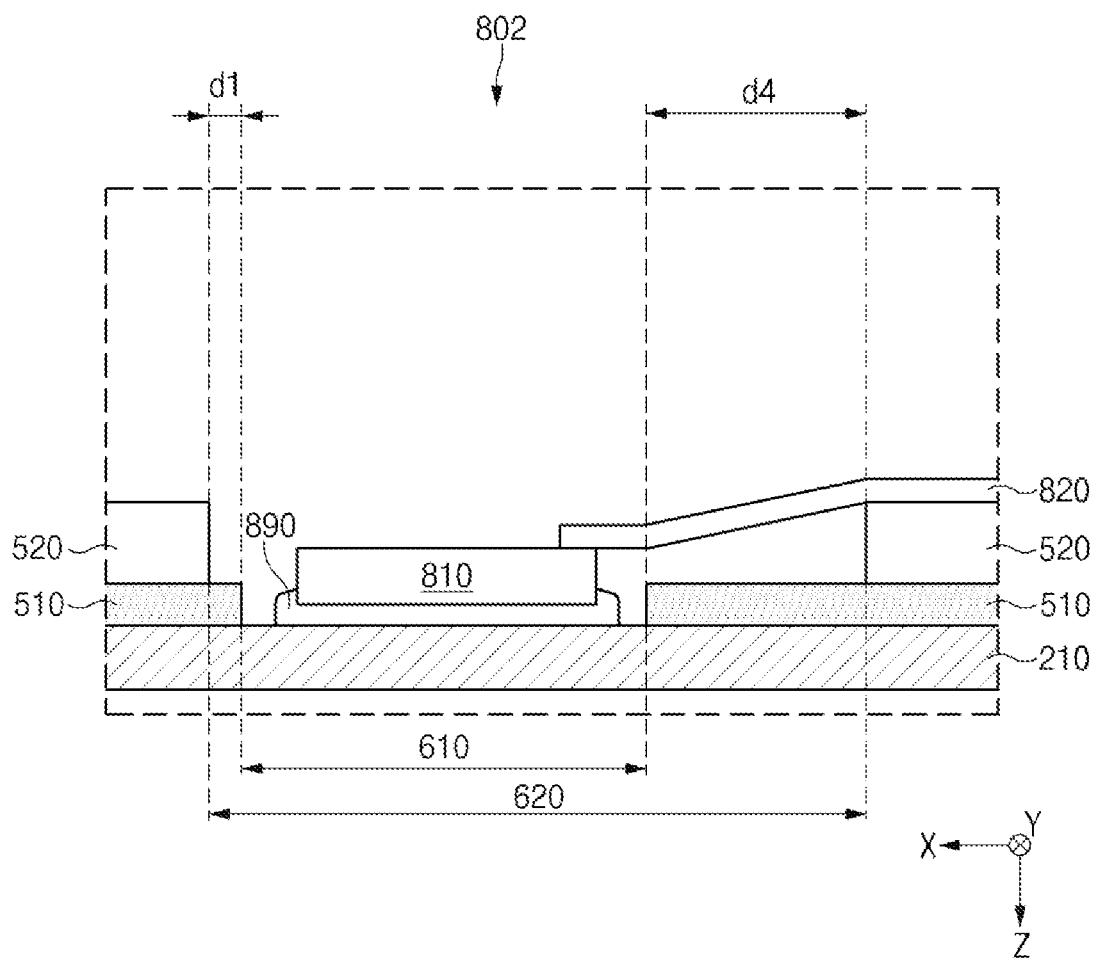
FIG. 8B is a cross-sectional view illustrating an example display module taken along line B-B' of FIG. 8A, according to an embodiment.

FIG. 8A is a diagram illustrating an example sensor mounting structure 801, according to an embodiment. FIG. 8B is a cross-sectional view 802 of a display module taken along line B-B' of FIG. 8A, according to an embodiment.

Referring to FIGS. 8A and 8B, according to an embodiment, a sensor (e.g., the sensor 240 of FIGS. 4A and 4B) may be attached to the first panel 210 through the first opening 610. For example, the sensor 240 may include a sensor circuit 810 and a connecting member 820 (e.g., a flexible printed circuit (FPCB)). For example, the sensor circuit 810 may be attached to the first panel 210 through an adhesive material 890 (e.g., resin or epoxy) applied on the first panel 210. The adhesive material 890, may, for example, be an adhesive material cured at a lower temperature (e.g., a temperature of about 40° C. to about 60° C. or less), may be a light shielding material.

In the example of FIGS. 8A and 8B, a photo-curable adhesive material may be used to fix the sensor 240 on the first panel 210 during the curing process of the adhesive material 890. For example, a plurality of UV (ultra-violet) adhesive points 891, 892, 893, and 894 may be used. After the sensor circuit 810 is positioned on the first panel 210, the UV adhesive points 891, 892, 893, and 894 are formed, and the sensor circuit 810 may be fixed onto the first panel 210 through UV curing. After fixing the sensor circuit 810 onto the first panel 210, the curing process (e.g., a heat treatment process and/or a bubble removing process) may be performed to cure the adhesive material 890. The UV adhesive points 891, 892, 893, and 894 are provided for the illustrative purpose, embodiments in the disclosure are not limited thereto. According to an embodiment, a fixing process using the UV adhesive points 891, 892, 893, and 894 may be omitted.

As illustrated in FIGS. 8A and 8B, a space (e.g., an air gap) may be present between the adhesive material 890 and the first layer 510. For example, the air gap may be formed between the adhesive material 890 and the first layer 510, along the circumference of the adhesive material 890, or along the inner sidewall of the first layer 510. When a light shielding material (e.g., the first layer 510 and/or the adhesive material 890) is not in the air gap, light from the outside may be introduced through the air gap. According to an embodiment, the light shieling material may be applied to the air gap to be filled in the air gap.

Figure 9A:
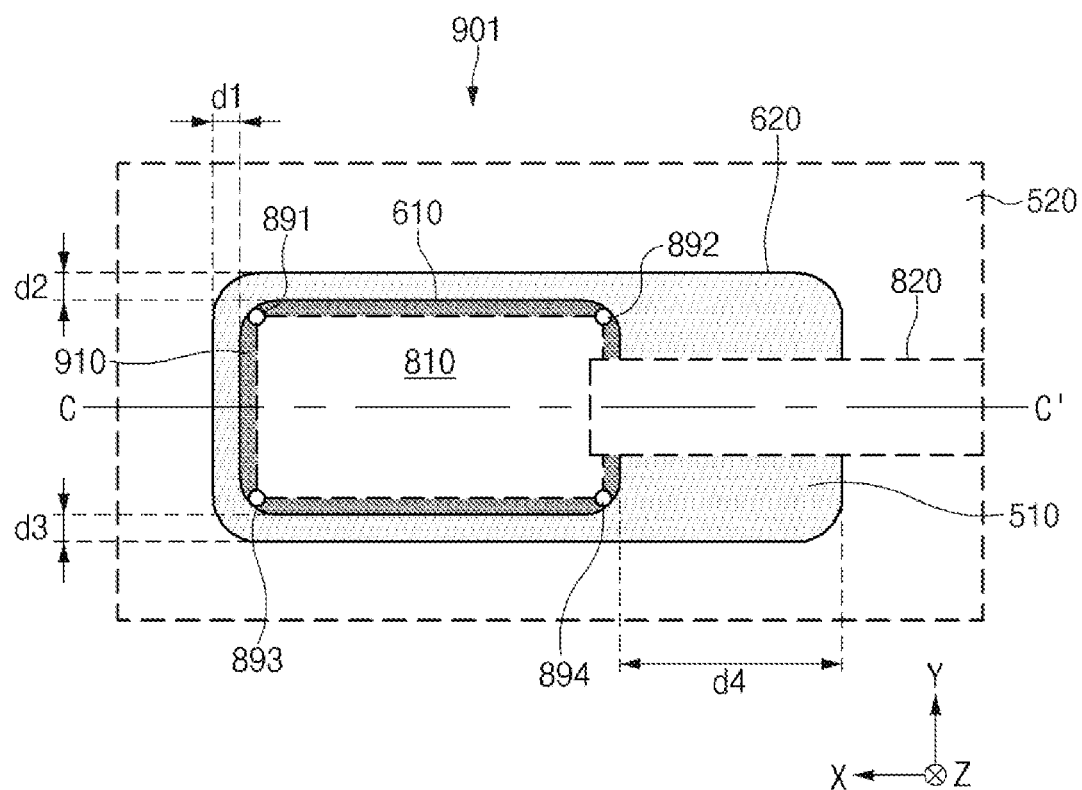
FIG. 9A is a diagram illustrating an example sensor mounting structure applied with a light shielding material, according to an embodiment.
Figure 9B:
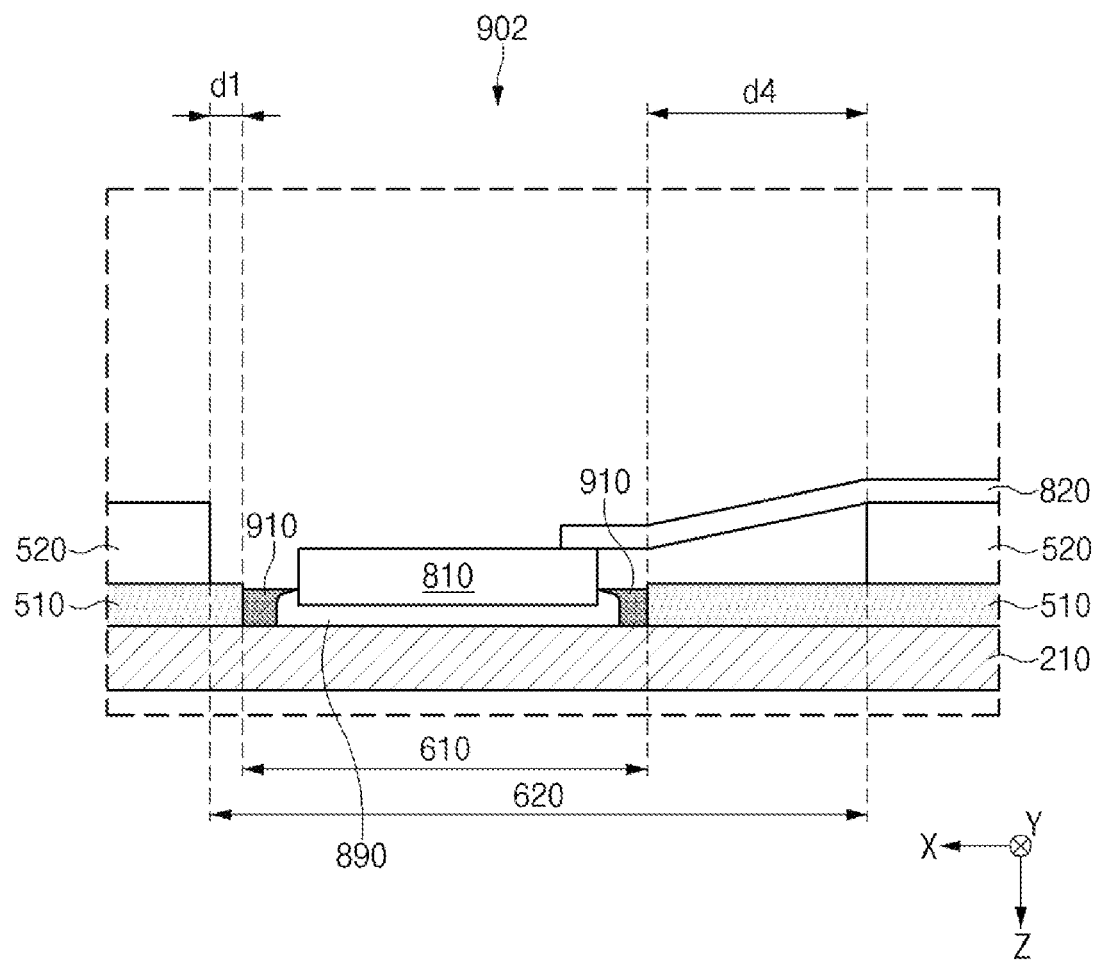
FIG. 9B is a cross-sectional view illustrating an example display module taken along line C-C' of FIG. 9A, according to an embodiment.

FIG. 9A is a diagram illustrating an example sensor mounting structure 901 applied with a light shielding material, according to an embodiment. FIG. 9B is a cross-sectional view 902 of a display module taken along line C-C' of FIG. 9A, according to an embodiment.

Referring to FIGS. 9A and 9B, a light shielding material 910 may be applied onto the first panel 210 along the inner sidewall of the first opening 610. The light shielding material 910 covers the air gap, so the external light may be prevented from being introduced and/or may be reduced. For example, the light shielding material 910 may be a lower viscosity material (e.g., epoxy or liquid) including a light shielding ingredient (e.g., a black ink). The light shielding material 910 is the lower viscosity material having a viscosity lower than a specified viscosity. Accordingly, the light shielding material 910 may be spread along the circumference of the adhesive material 890 which is applied to a point between the light shielding material 910 and the first layer 510 and including an area covered by the connecting member 820. For example, the light shielding material 910 may be a material to be dried at a room temperature. For example, an additional heat treatment process is not required for the light shielding material 910, thereby preventing and/or reducing the performance from being deteriorated due to the heat treatment for the display module and the display.

As an amount of the light shielding material 910 is increased, the light shielding material 910 may flow over the recess formed by the first opening 610 in the first layer 510. When the light shielding material 910 is absorbed into the second layer 520, the first layer 510 may be delaminated from the second layer 520. In addition, the light shielding degree may be irregular due to the light shielding material 910 absorbed. As illustrated in FIGS. 9A and 9B, a step-difference area is present between the first opening 610 and the second opening 620 to prevent and/or reduce the light shielding material 910 from reaching the second layer 520.

Figure 10A:
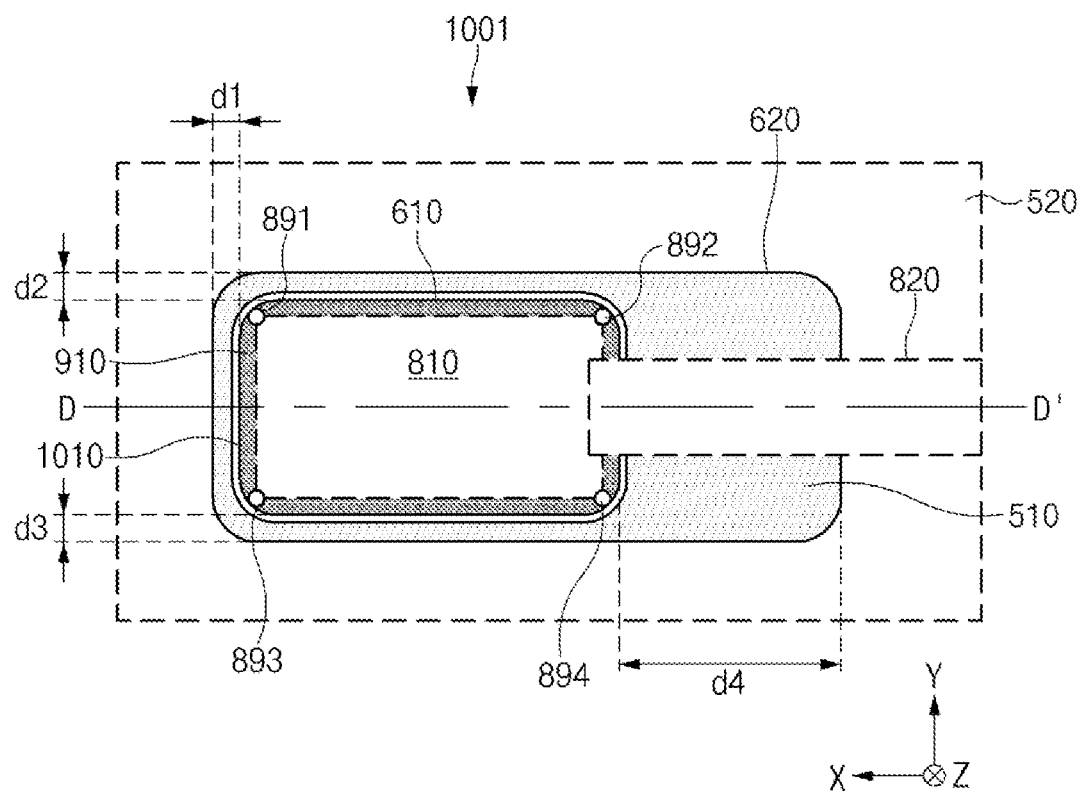
FIG. 10A is a diagram illustrating an example sensor mounting structure including a wall structure, according to an embodiment.
Figure 10B:
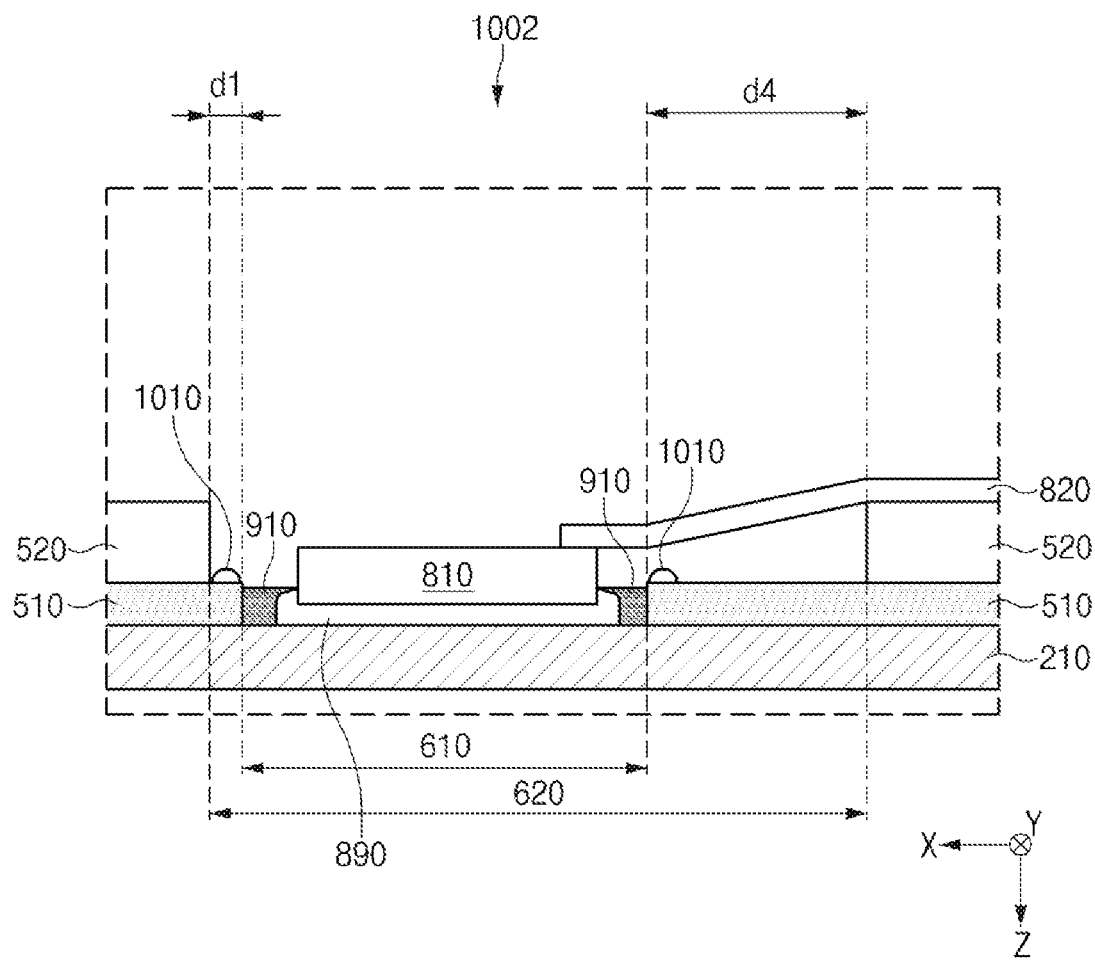
FIG. 10B is a cross-sectional view illustrating an example display module taken along line D-D' of FIG. 10A, according to an embodiment.

FIG. 10A is a diagram illustrating an example sensor mounting structure 1001 including a wall structure, according to an embodiment. FIG. 10B is a cross-sectional view 1002 of a display module taken along line D-D' of FIG. 10A, according to an embodiment.

According to an embodiment, a protrusion 1010 may be formed on the first layer 510. For example, the protrusion 1010, which may, for example, have a closed-loop shape, may be positioned in a space, which is interposed between the circumference of the first opening 610 and the inner sidewall of the second opening 620, at the first layer 510 The protrusion 1010 may be a wall structure to prevent and/or reduce the light shielding material 910 from being absorbed into the second layer 520.

According to an embodiment, the protrusion 1010 may be formed on the first layer 510 before the sensor circuit 810 is bonded. For example, the protrusion 1010 may be an adhesive member (e.g., a tape) or an adhesive material (e.g., UV curable resin).

Figure 11A:
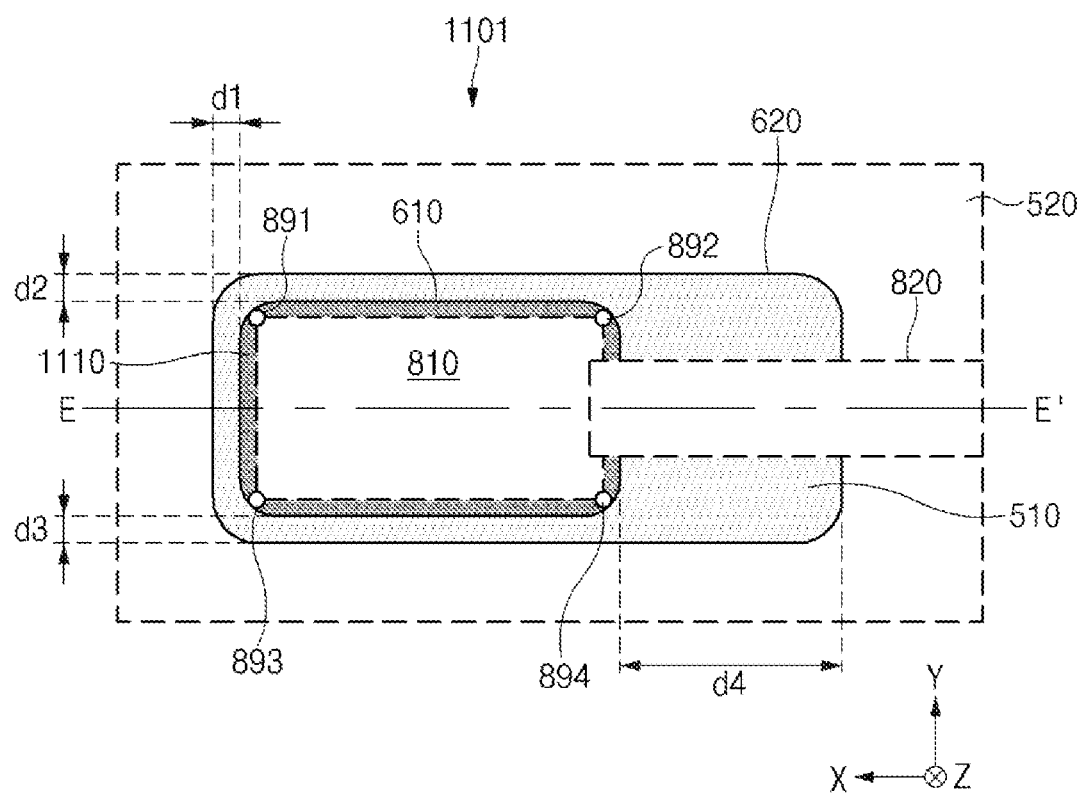
FIG. 11A is a diagram illustrating an example sensor mounting structure applied with a light shielding adhesive material, according to an embodiment.
Figure 11B:
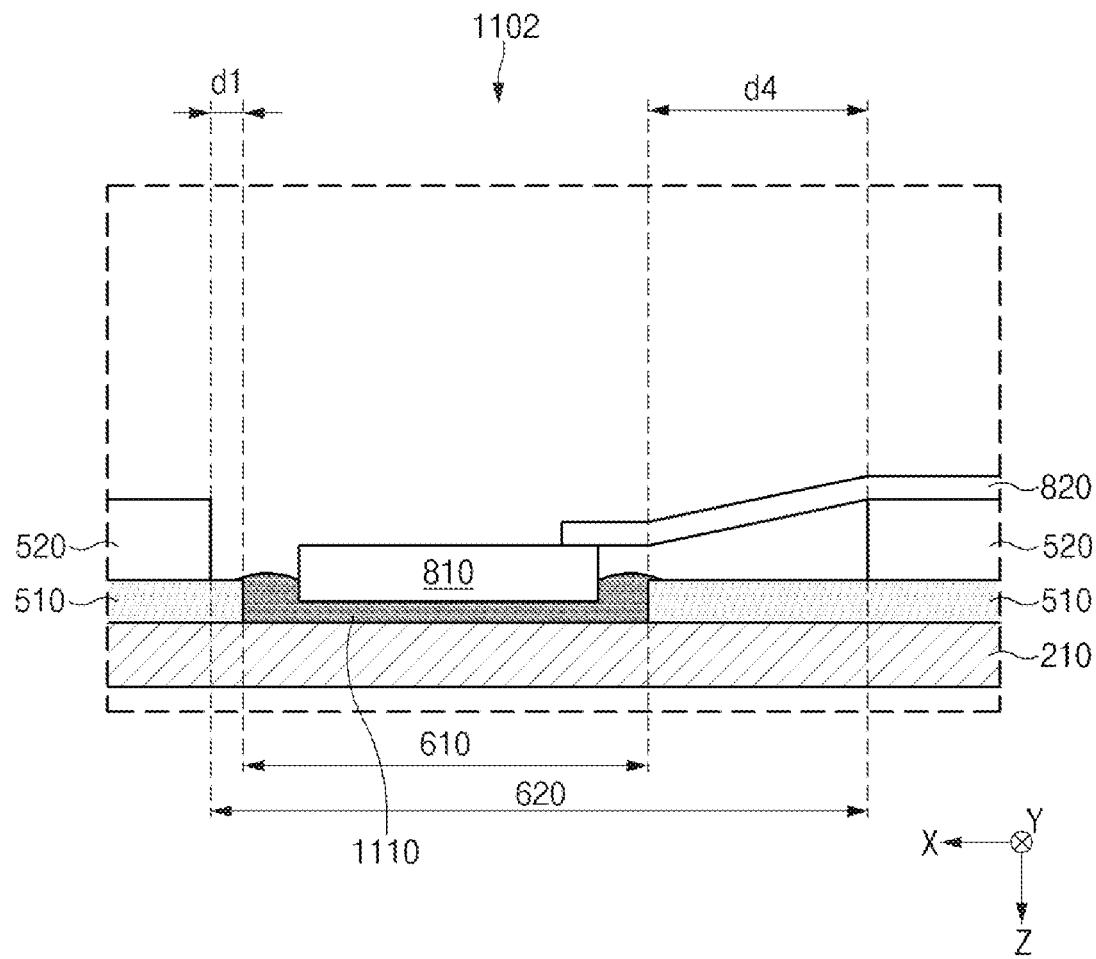
FIG. 11B is a cross-sectional view illustrating an example display module taken along line E-E' of FIG. 11A, according to an embodiment.

FIG. 11A is a diagram illustrating an example sensor mounting structure 1101 applied with a light shielding adhesive material 1110, according to an embodiment. FIG. 11B is a cross-sectional view 1102 of a display module along line E-E' in FIG. 11A, according to an embodiment.

According to an embodiment, the light shielding adhesive material 1110 (e.g., the adhesive material 890 of FIGS. 8A and 8B) may be applied to all areas of the first panel 210 exposed through the first opening 610. In this case, the all areas of the first panel 210 may be covered with the light shielding adhesive material 1110, so the air gap described with reference to FIGS. 8A and 8B may be removed.

As illustrated in FIGS. 11A and 11B, after the light shielding adhesive material 1110 is applied to the first panel 210 through the first opening 610, the sensor circuit 810 may be attached to the first panel 210 through a compressing process. In this case, the light shielding adhesive material 1110 may overflow out of the recess, which is formed by the first opening 610 in the first layer 510, through the compressing process. The second opening 620 is formed to be larger than the first opening 610. Accordingly, the light shielding adhesive material 1110 overflowing the first layer 510 may be prevented from and/or avoid being absorbed into the second layer 520. For another example, the display module 200 may further include a wall structure described with reference to FIGS. 10A and 10B.

According to an embodiment, the light shielding adhesive material 1110 may include, for example, and without limitation, black ink, an epoxy film, a die attach film (DAF), and/or a polyimide (PI) shielding film. For example, the light shielding adhesive material 1110 may be a lower-temperature fast cure adhesive material. For example, the light shielding adhesive material 1110 may be a low-viscosity material to be naturally dried (e.g., at a room temperature).

Figure 12:
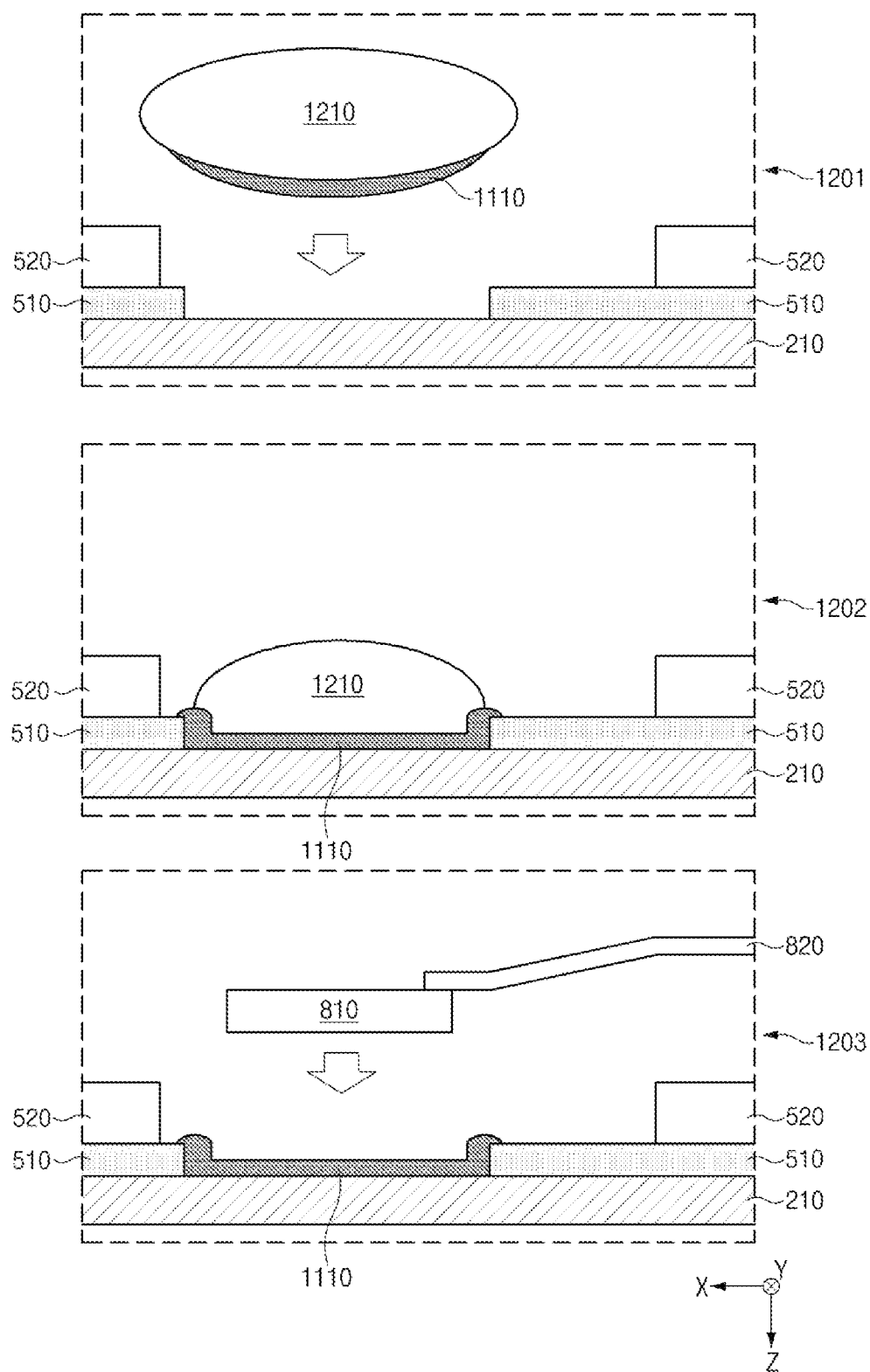
FIG. 12 is a diagram illustrating an example method of applying a light shielding adhesive material, according to an embodiment.

FIG. 12 is a diagram illustrating an example method of applying a light shielding adhesive material 1110, according to an embodiment.

According to an embodiment, the light shielding adhesive material 1110 may, for example, be applied onto the first panel 210 in a pad printing type.

Referring to reference numeral 1201, the light shielding adhesive material 1110 (e.g., epoxy) may be applied onto a pad 1210. For example, the pad 1210 may include a low hardness and flexible material. Referring to reference numeral 1202, the pad 1210 may allow the light shielding adhesive material 1110 to be applied onto the whole area of the first panel 210, which is exposed through the first opening 610, through the compressing process. The pad 1210 has a flexible property. Accordingly, the light shielding adhesive material 1110 may be applied depending on the shape of the recess formed in the first layer 510. Referring to reference numeral 1203, after applying the light shielding adhesive material 1110, the sensor circuit 810 may be attached.

As described with reference to FIGS. 11A and 11B, the light shielding adhesive material 1110 may be prevented from and/or avoid being absorbed into the second layer 520 due to the step difference formed by the first opening 610 and the second opening 620. According to an embodiment, the wall structure described with reference to FIGS. 10A and 10B may be formed before the compressing process of reference numeral 1202.

Figure 13:
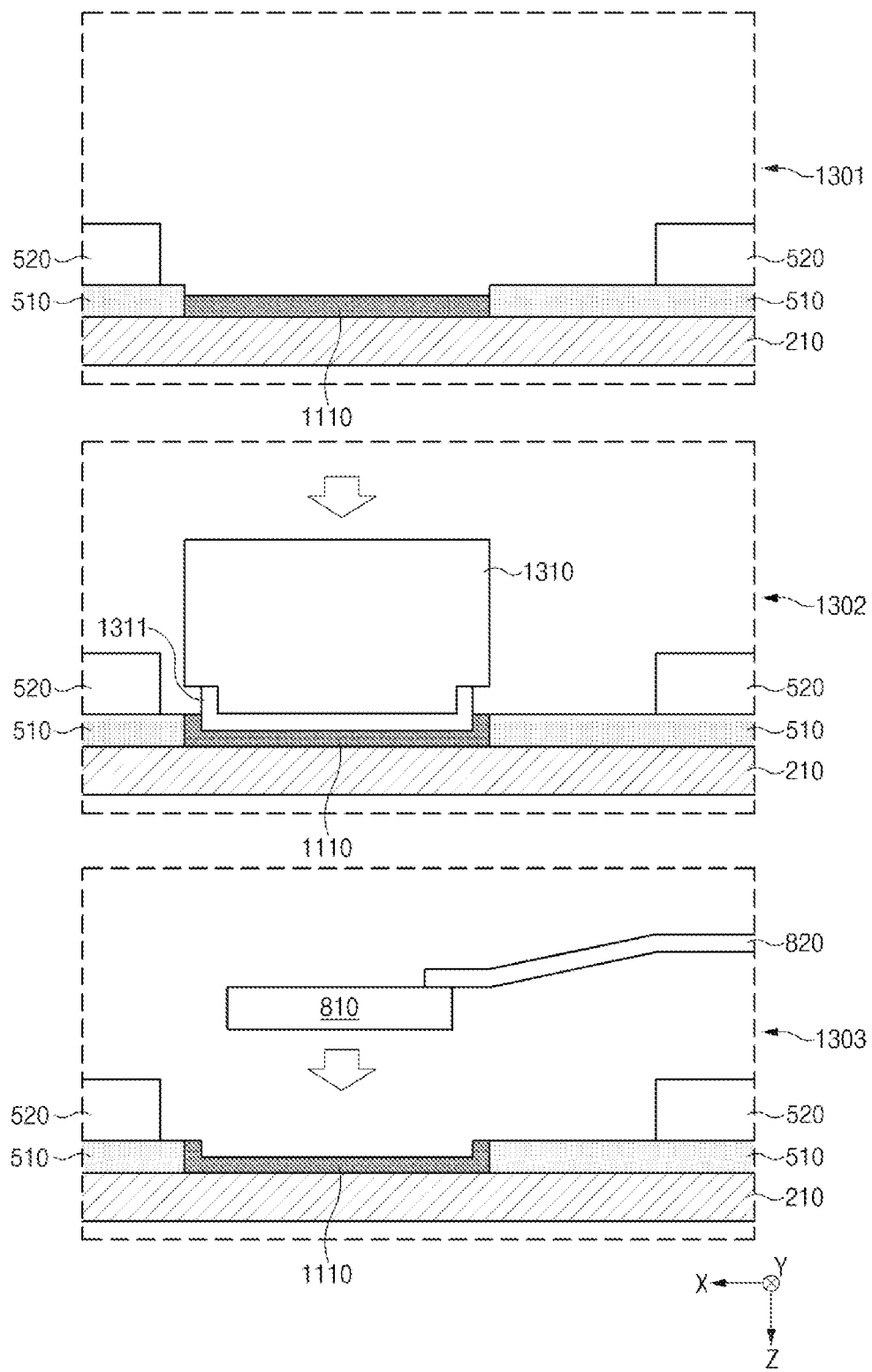
FIG. 13 is a diagram illustrating an example method of applying a light shielding adhesive material, according to an embodiment.

FIG. 13 is a diagram illustrating an example method of applying the light shielding adhesive material 1110, according to an embodiment.

According to an embodiment, the light shielding adhesive material 1110 may be applied onto the first panel 210 in a vacuum laminate type.

Referring to reference numeral 1301, the light shielding adhesive material 1110 (e.g., epoxy) may be applied onto a pad 1310. For example, the pad 1310 may include an end portion 1311 including a low hardness and flexible material. Referring to reference numeral 1302, the pad 1310 may allow the light shielding adhesive material 1110 to be applied onto the whole area of the first panel 210, which is exposed through the first opening 610, through the compressing process. The end portion 1311 has a flexible property. Accordingly, the light shielding adhesive material 1110 may be applied in the shape of the recess formed in the first layer 510. The light shielding adhesive material 1110 may be applied in the shape of the recess by, for example, air-blowing through the end portion 1311, in the compressing process. Referring to reference numeral 1303, after applying the light shielding adhesive material 1110, the sensor circuit 810 may be attached.

As described with reference to FIGS. 11A and 11B, the light shielding adhesive material 1110 may be prevented from and/or avoid being absorbed into the second layer 520 due to the step difference formed by the first opening 610 and the second opening 620. According to an embodiment, the wall structure described with reference to FIGS. 10A and 10B may be formed before the compressing process of reference numeral 1302.

Figure 14:
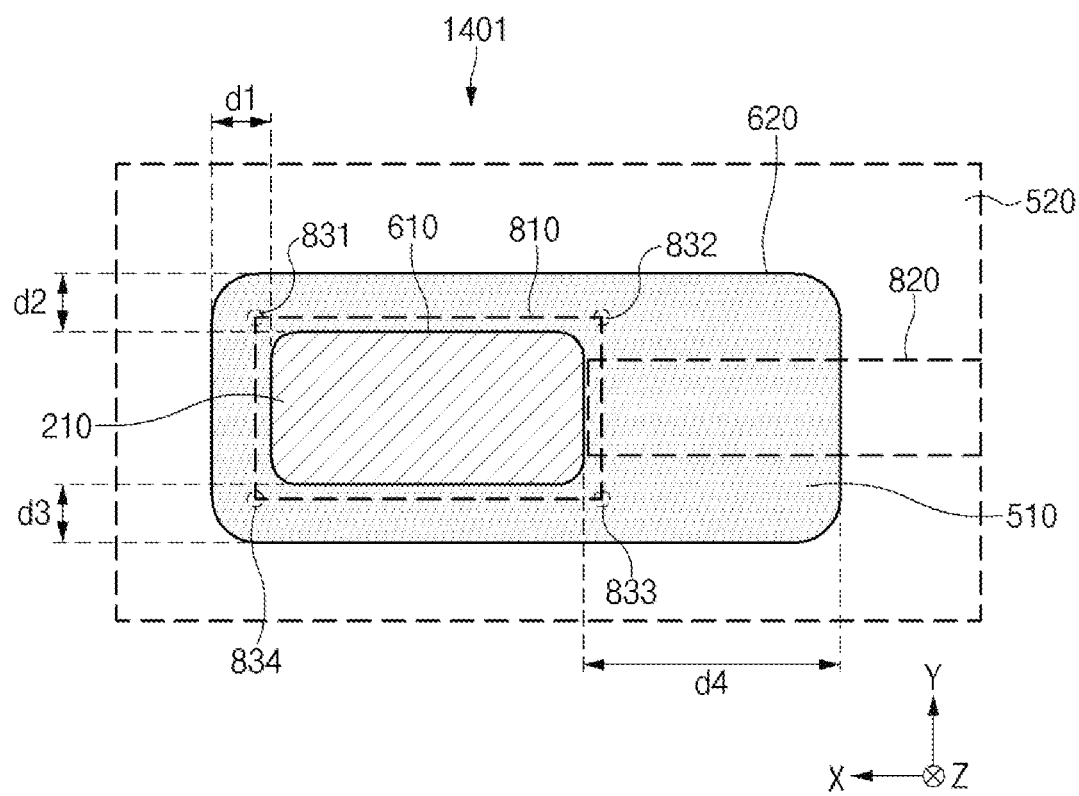
FIG. 14 is a diagram illustrating an example opening structure, according to an embodiment.

FIG. 14 is a diagram illustrating an example opening structure 1401, according to an embodiment.

According to an embodiment, the size of the first opening 610 formed in the first layer 510 may be smaller than the sensor circuit 810. For example, the area, which is exposed through the first opening 610, of the first panel 210 may be smaller than the size of the surface (e.g., the first surface 241 of FIGS. 4A and 4B) of the sensor circuit 810 facing the first panel 210. The circumference of a closed area formed by the first opening 610 may be smaller than the circumference of the first surface, which faces the first layer 510, of the sensor circuit 810. For example, the first opening 610 may correspond to a portion (e.g., a sensing area) of the sensor circuit 810.

As illustrated in FIG. 14, because the first opening 610 is formed to be smaller than the sensor circuit 810, the whole area of the first opening 610 in the first layer 510 may be covered by the sensor circuit 810. When viewed from the top (viewed in the +Z axis direction), the first panel 210 may not be exposed due to the sensor circuit 810 and the first layer 510.

Figure 15:
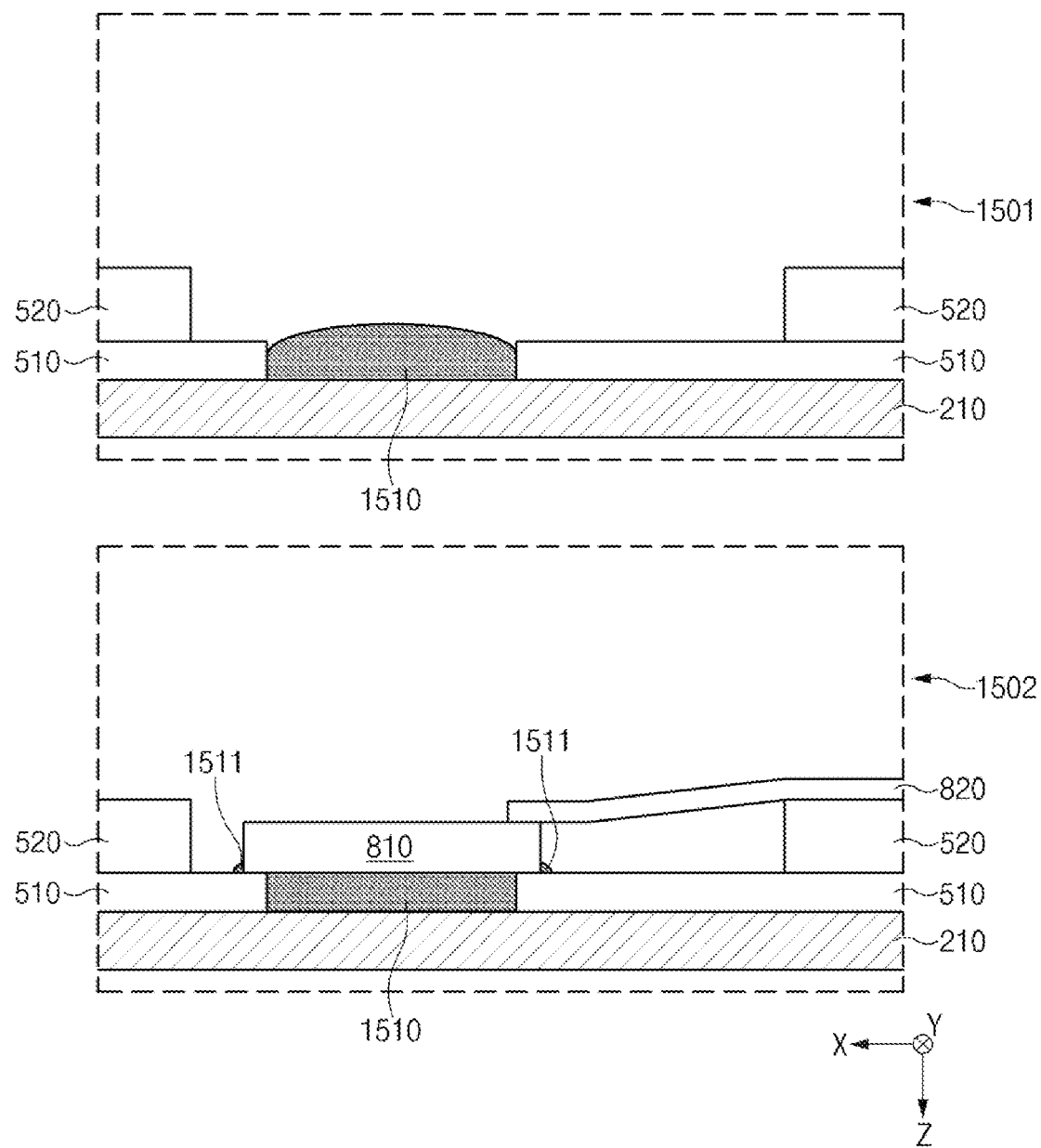
FIG. 15 is a diagram illustrating an example method for mounting a sensor in an opening structure of FIG. 14, according to an embodiment.

FIG. 15 is a diagram illustrating an example method for mounting a sensor in a sensor opening structure of FIG. 14, according to an embodiment.

Referring to reference numeral 1501, an adhesive material 1510 (e.g., resin) may be applied into a recess formed in the first layer 510 by the first opening 610. For example, the adhesive material 1510 may be applied in an amount capable of filling the entire portion of the recess formed in the first layer 510 by at least the first opening 610.

Referring to reference numeral 1502, the sensor circuit 810 may be positioned on the first layer 510 to cover the first opening 610. For example, to ensure that the adhesive material 1510 is filled in the entire portion of the space formed through the first opening 610 between the sensor circuit 810 and the first panel 210, the adhesive material 1510 may be applied in an amount larger than an amount of an adhesive material applied into the recess formed in the first layer 510 by the first opening 610. In this case, an excess amount 1511 may overflow the first layer 510 depending on the compressing process of the sensor circuit 810. The second opening 620 of the second layer 520 is formed to be spaced apart from the circumference of the first opening 610. Accordingly, the excess amount 1511 may be prevented from and/or avoid contaminating the second layer 520.

Figure 16:
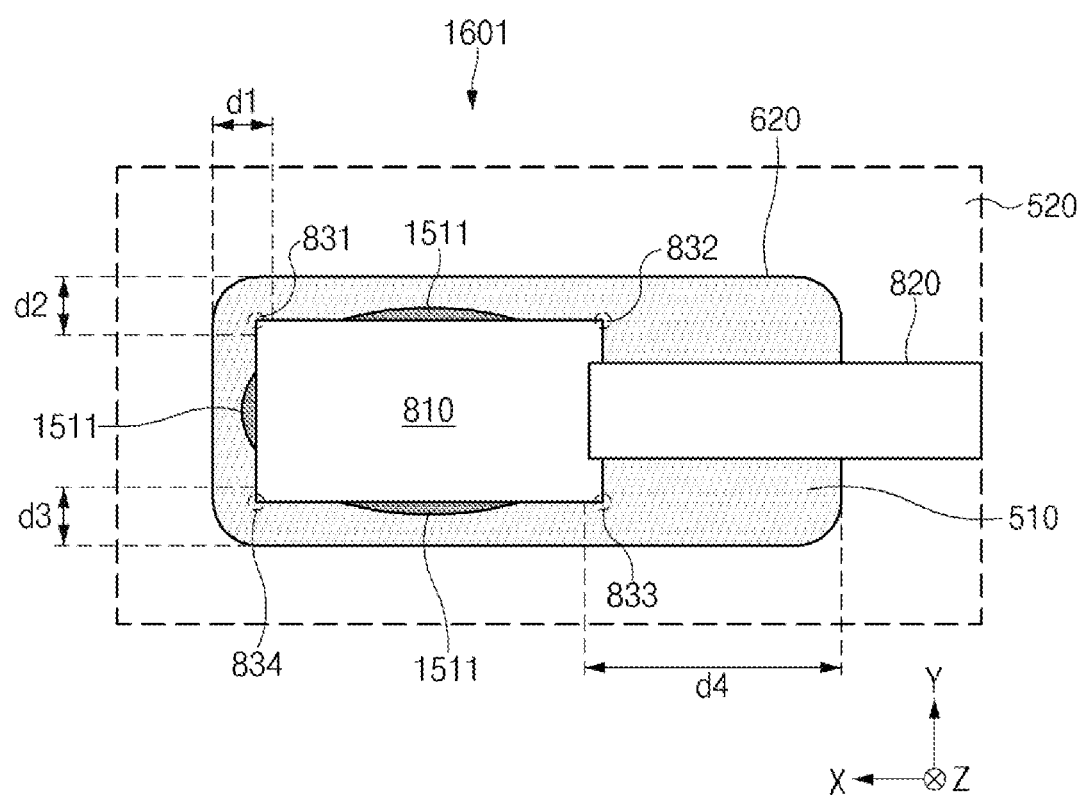
FIG. 16 is a diagram illustrating an example mounting structure of a sensor mounted according to the mounting method of FIG. 15, according to an embodiment.

FIG. 16 illustrates a mounting structure 1601 of a sensor mounted through the mounting method of FIG. 15.

According to an embodiment, at least a portion of the sensor circuit 810 may be attached to the first layer 510. For example, a portion (e.g., an edge) of the sensor circuit 810 may be coupled to an adhesive layer (e.g., the second adhesive layer 322 of FIG. 5) of the first layer 510. The sensor circuit 810 is fixed by the adhesive layer, so the fixing of the sensor circuit 810 required in the curing process of the adhesive material 1510 may be provided by the adhesive layer. According to another embodiment, adhesive points 831, 832, 833, and 834 may be positioned in at least some of the corners of the sensor circuit 810 to more securely fix the sensor circuit 810.

Figure 17:
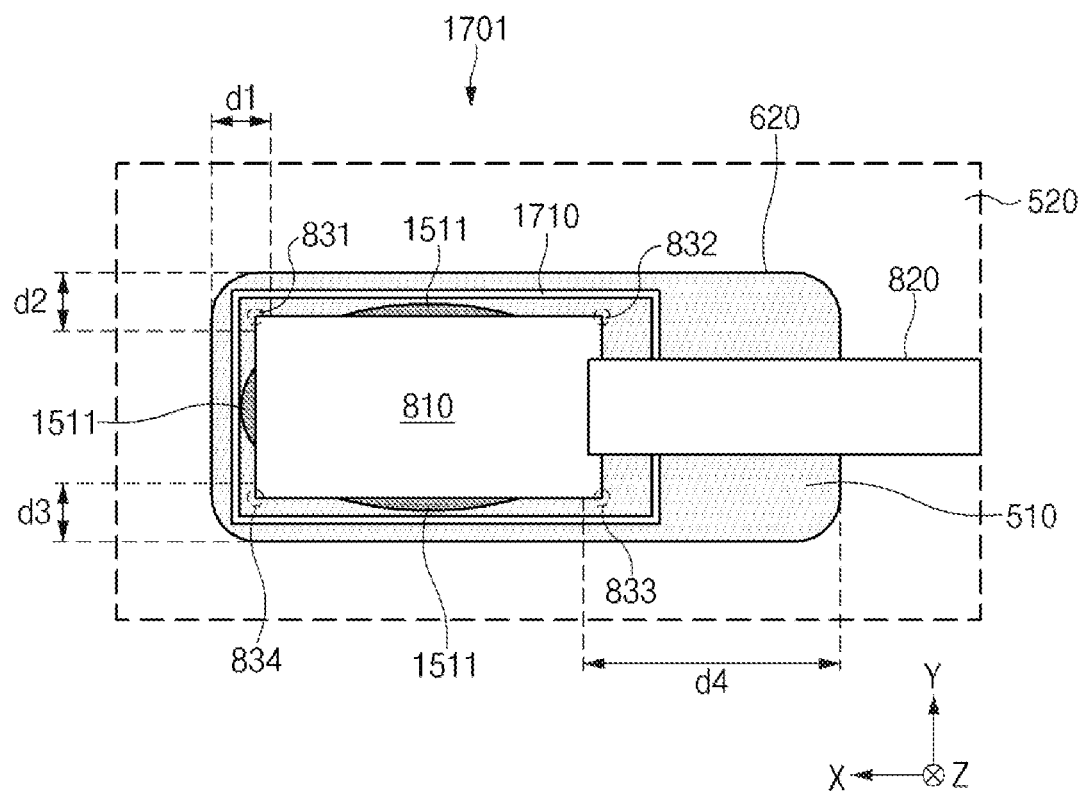
FIG. 17 is a diagram illustrating an example sensor mounting structure including a wall structure, according to an embodiment.

FIG. 17 is a diagram illustrating an example sensor mounting structure 1701 including a wall structure, according to an embodiment.

According to an embodiment, a display module may include a protrusion 1710 formed on the first layer 510. For example, the protrusion 1710, which may, for example, have a closed-loop shape, may be positioned in a space on the first layer 510, which is interposed between the circumference of the sensor circuit 810 and the inner sidewall of the second opening 620. The protrusion 1710 may be a wall structure to prevent and/or reduce the adhesive material 1510 from being absorbed into the second layer 520. For example, the protrusion 1710 may prevent and/or reduce the excess amount 1511 of the adhesive material 1510 from reaching the second layer 520.

According to an embodiment, the protrusion 1710 may be formed on the first layer 510 before the sensor circuit 810 is bonded. For example, the protrusion 1710 may be an adhesive member (e.g., a tape) or an adhesive material (e.g., UV curable resin).

According to various example embodiments, an electronic device (e.g., the electronic device 100 of FIG. 1) may include: a housing (e.g., the housing 110 of FIG. 1), a display (e.g., the display 101 of FIG. 1), and a sensor (e.g., the sensor 240 of FIGS. 4A and 4B). A display module may include a first panel (e.g., the first panel 210 of FIGS. 4A and 4B) having a first surface, a second surface opposite the first surface, and a plurality of pixels interposed between the first surface and the second surface; a cover layer (e.g., the cover layer 230 of FIGS. 4A and 4B) disposed on the first surface of the first panel; and a second panel (e.g., the second panel 220 of FIGS. 4A and 4B) disposed on the second surface of the first panel. A sensor may be coupled to the second surface of the first panel. For example, the sensor may form a sensing area (e.g., the sensing area 110F of FIG. 1) on one surface of the housing. The display may include an opening (e.g., the opening 225 of FIGS. 4A and 4B) provided in the second panel and at least a portion of the sensor may be disposed in the opening, and the second panel may include a first layer (e.g., the first layer 510 of FIG. 5) coupled to the first panel on one surface of the second panel and a second layer (e.g., the second layer 520 of FIG. 5 coupled to the first layer on a surface opposite the one surface of the first layer. The opening may include a first opening (e.g., the first opening 610 of FIG. 6) in the first layer, and the first opening may be provided inside a closed area formed by a second opening (e.g., the second opening 620 of FIG. 6) in the second layer. A circumference of the first opening may be spaced apart, by at least a specified distance, from a circumference of the second opening in the second layer.

According to an example embodiment, the second layer may include a conductive layer to provide electrical shielding, and the first layer may include a layer to provide optically shielding.

According to an embodiment, the sensor may be attached to the second surface of the first panel through an adhesive material (e.g., the adhesive material 890 of FIG. 9B) inside the first opening The electronic device may further include a light shielding material (e.g., the light shielding material 910 of FIG. 9B) filled in a mounting area provided by the adhesive material of the second surface of the first panel and an area between the mounting area and the first opening. For example, the light shielding material may have a specified viscosity or less and may be dried at a room temperature.

According to an example embodiment, the electronic device may further include a protrusion (e.g., the protrusion 1010 of FIGS. 10A and 10B) disposed on the first layer in an area between the second opening and the first opening, and having a closed-loop shape.

According to an example embodiment, the electronic device may further include a light shielding adhesive material (e.g., the light shielding adhesive material 1110 of FIGS. 11A and 11B) applied to an area exposed through the first opening of the second surface of the first panel. The sensor may be attached to the second surface of the first panel using the light shielding adhesive material. For example, the light shielding adhesive material may be applied to an entire area exposed through the first opening of the second surface of the first panel through a compressing process (e.g., the compression process of FIG. 12 or 13). For example, the electronic device may further include a protrusion (e.g., the protrusion 1010 of FIGS. 10A and 10B) disposed on the first layer in an area between the second opening and the first opening, and having a closed-loop shape.

According to an example embodiment, an entire exposed through the first opening of the second surface of the first panel may be covered by the sensor. For example, a portion of the sensor may be attached to the second surface of the first panel by an adhesive material (e.g., the adhesive material 1510 of FIG. 15) filled in the first opening through the first opening and a remaining portion of the sensor may be attached onto the first layer.

According to various example embodiments, a display module (e.g., the display module 200 of FIGS. 4A and 4B) may include: a first panel (e.g., the first panel 210 of FIGS. 4A and 4B) including a first surface, a second surface opposite the first surface, and a plurality of pixels interposed between the first surface and the second surface; a cover layer (e.g., the cover layer 230 of FIGS. 4A and 4B) disposed on the first surface of the first panel; a second panel (e.g., the second panel 220 of FIGS. 4A and 4B) disposed on the second surface of the first panel; and a sensor (e.g., the sensor 240 of FIGS. 4A and 4B) coupled to the second surface of the first panel. The sensor may be coupled to the second surface of the first panel. For example, the sensor may form a sensing area (e.g., the sensing area 110F of FIG. 1) on one surface of the housing. The display module may include an opening (e.g., the opening 225 of FIGS. 4A and 4B) extending through the second panel and at least a portion of the sensor may be disposed in the opening, and the second panel may include a first layer (e.g., the first layer 510 of FIG. 5) coupled to the first panel on one surface of the second panel and a second layer (e.g., the second layer 520 of FIG. 5) coupled to the first layer on a surface opposite the one surface of the first layer. The opening may include a first opening (e.g., the first opening 610 of FIG. 6) in the first layer, and the first opening may be provided inside a closed area of a second opening (e.g., the second opening 620 of FIG. 6) in the second layer. A circumference of the first opening may be spaced apart from a circumference of the second opening in the second layer by at least a specified distance.

According to an example embodiment, the second layer may include a conductive layer configured to provide electrical shielding, and the first layer may include a layer configured to provide optical shielding.

According to an example embodiment, the sensor may be attached to the second surface of the first panel through an adhesive material (e.g., the adhesive material 890 of FIG. 9B) in the first opening The electronic device may further include a light shielding material (e.g., the light shielding material 910 of FIG. 9B) in a mounting area formed by the adhesive material of the second surface of the first panel and an area between the mounting area and the first opening. For example, the light shielding material may have a specified viscosity or less and may be dried at a room temperature.

According to an example embodiment, the display module may further include a protrusion (e.g., the protrusion 1010 of FIGS. 10A and 10B) disposed on the first layer and in an area between the second opening and the first opening, and having a closed-loop shape.

According to an example embodiment, the display module may further include a light shielding adhesive material (e.g., the light shielding adhesive material 1110 of FIGS. 11A and 11B) applied to an entire area exposed through the first opening of the second surface of the first panel. The sensor may be attached to the second surface of the first panel by the light shielding adhesive material. For example, the light shielding adhesive material may be applied to the entire area exposed through the first opening of the second surface of the first panel through a compressing process (e.g., the compression process of FIG. 12 or 13). For example, the electronic device may further include a protrusion (e.g., the protrusion 1010 of FIGS. 10A and 10B) disposed on the first layer in an area between the second opening and the first opening, and having a closed-loop shape.

According to an example embodiment, an entire area exposed through the first opening of the second surface of the first panel may be covered by the sensor. For example, a portion of the sensor may be attached to the second surface of the first panel by an adhesive material (e.g., the adhesive material 1510 of FIG. 15) filled in the first opening and a remaining portion of the sensor may be attached onto the first layer.

Various embodiments of the disclosure and terms used herein are not intended to limit the technologies described in the disclosure to specific embodiments, and it should be understood that the embodiments and the terms include various modifications, equivalents, and/or alternatives on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may refer, for example, to the device being "capable of" operating together with another device or other parts. For example, a "processor configured to (or set to) perform A, B, and C" may refer, for example, to a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device.

The term "module" used herein may include a unit, which is implemented with hardware, software, or firmware, or any combination thereof, and may be interchangeably used with the terms "logic", "logical block", "part", or "circuit". The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be include a single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

According to various embodiments disclosed in the disclosure, the sensor mounting area positioned under the display may be prevented from and/or avoid being viewed from the outside of the electronic device.

According to various embodiments disclosed in the disclosure, the adhesive material may be prevented from and/or avoid being absorbed into a buffer layer.

Besides, a variety of effects directly or indirectly understood through the disclosure may be provided.

While the disclosure has been illustrated and described with reference to various example embodiments thereof, it will be understood that the various example embodiments are intended to be illustrative, not limiting. It will also be understood by those skilled in the art that various changes in form and details may be made therein without departing from the true spirit and full scope of the disclosure, including the appended claims and their equivalents.

What is claimed is:

1. An electronic device comprising: a housing; a display including a first panel having a plurality of pixels interposed between a first surface and a second surface opposite the first surface, a cover layer disposed on the first surface, and a second panel disposed on the second surface; and a sensor coupled to the second surface of the first panel of the display, wherein the display includes an opening in the second panel, wherein at least a portion of the sensor is disposed in the opening, wherein the second panel includes: a first layer coupled to the first panel on one surface of the second panel, and a second layer coupled to the first layer on a surface opposite the one surface, wherein the opening includes a first opening in the first layer, wherein the first opening is provided in a closed area of a second opening in the second layer, and wherein a circumference of the first opening is spaced apart from a circumference of the second opening in the second layer; and the second layer includes a conductive layer configured to provide electrical shielding, and wherein the first layer includes a layer configured to provide optical shielding; and the sensor is attached to the second surface of the first panel through an adhesive material disposed in the first opening, and wherein the electronic device further includes: a light shielding material disposed in a mounting area of the second surface of the first panel between the adhesive material and the first opening.

2. The electronic device of claim 1, wherein the light shielding material has a specified viscosity or less, and is configured to be dried at a room temperature.

3. The electronic device of claim 1, further comprising: a protrusion disposed on the first layer in an area between the second opening and the first opening, the protrusion having a closed-loop shape.

4. The electronic device of claim 1, further comprising: a light shielding adhesive material disposed on an entire area of the second surface of the first panel exposed through the first opening,
wherein the sensor is attached to the second surface of the first panel by the light shielding adhesive material.

5. The electronic device of claim 4, wherein the light shielding adhesive material is provided in an entire area of the second surface of the first panel exposed through the first opening by compression.

6. The electronic device of claim 5, further comprising:

a protrusion provided on the first layer in an area between the second opening and the first opening, the protrusion having a closed-loop shape.

7. The electronic device of claim 1, wherein an entire area of the second surface of the first panel exposed through the first opening is covered by the sensor.

8. The electronic device of claim 7, wherein a portion of the sensor is attached to the second surface of the first panel though the first opening by an adhesive material provided in the first opening, and wherein a remaining portion of the sensor is attached to the first layer.

9. A display module comprising: a first panel including a first surface, a second surface opposite the first surface, and a plurality of pixels interposed between the first surface and the second surface; a cover layer disposed on the first surface of the first panel; a second panel disposed on the second surface of the first panel; and a sensor coupled to the second surface of the first panel, wherein the second panel includes a first layer coupled to the first panel on one surface of the second panel and a second layer coupled to the first layer, on a surface opposite to the one surface, wherein the second panel includes an opening extending through the second panel, wherein at least a portion of the sensor is disposed in the opening, wherein the opening includes a first opening in the first layer, wherein the first opening is provided inside a closed area of a second opening in the second layer, and wherein a circumference of the first opening is spaced apart from a circumference of the second opening on the second layer; and the second layer includes a conductive layer configured to provide electrical shielding, and wherein the first layer includes a layer configured to provide optical shielding; and the sensor is attached to the second surface of the first panel through an adhesive material disposed in the first opening, and wherein the electronic device further includes: a light shielding material disposed in a mounting area of the second surface of the first panel between the adhesive material and the first opening.

10. The display module of claim 9, wherein the light shielding material has a specified viscosity or less, and is configured to be dried at a room temperature.

11. The display module of claim 9, further comprising:

a protrusion disposed on the first layer in an area between the second opening and the first opening, the protrusion having a closed-loop shape.

12. The display module of claim 9, further comprising:

a light shielding adhesive material disposed on an entire area of the second surface of the first panel exposed through the first opening, wherein the sensor is attached to the second surface of the first panel by the light shielding adhesive material.

13. The display module of claim 12, wherein the light shielding adhesive material is disposed on the entire area of the second surface of the first panel exposed through the first opening by compression.

14. The display module of claim 13, further comprising:

a protrusion disposed on the first layer in an area between the second opening and the first opening, the protrusion having a closed-loop shape.

15. The display module of claim 9, wherein an entire area of the second surface of the first panel exposed through the first opening is covered by the sensor.

16. The display module of claim 15, wherein a portion of the sensor is attached to the second surface of the first panel through the first opening by an adhesive material disposed in the first opening, and wherein a remaining portion of the sensor is attached to the first layer.

\* \* \* \* \*